United States Patent
Hokuto et al.

(10) Patent No.: US 8,056,337 B2
(45) Date of Patent: Nov. 15, 2011

(54) INTERNAL COMBUSTION ENGINE AND CONTROL METHOD THEREOF

(75) Inventors: Hiroyuki Hokuto, Numazu (JP);
Shigeki Miyashita, Susono (JP);
Shinichiro Nogawa, Mishima (JP);
Kenji Harima, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 12/439,183

(22) PCT Filed: Sep. 13, 2007

(86) PCT No.: PCT/IB2007/002630
§ 371 (c)(1),
(2), (4) Date: Feb. 27, 2009

(87) PCT Pub. No.: WO2008/032187
PCT Pub. Date: Mar. 20, 2008

(65) Prior Publication Data
US 2010/0011762 A1    Jan. 21, 2010

(30) Foreign Application Priority Data
Sep. 14, 2006 (JP) .................................. 2006-249882

(51) Int. Cl.
*F02D 23/00* (2006.01)
(52) U.S. Cl. ............... 60/602; 60/286; 60/299; 60/274; 60/285; 123/559.1; 123/528
(58) Field of Classification Search .................... 60/274, 60/285, 286, 299, 602; 123/559.1, 528; *F02D 23/00*
See application file for complete search history.

(56) References Cited

U.S. PATENT DOCUMENTS

| | | | | |
|---|---|---|---|---|
| 3,943,710 A | * | 3/1976 | Lange | 60/288 |
| 5,582,004 A | * | 12/1996 | Rutschmann | 60/288 |
| 5,740,786 A | * | 4/1998 | Gartner | 123/568.12 |
| 6,557,341 B2 | * | 5/2003 | Bubeck et al. | 60/284 |
| 7,448,205 B2 | * | 11/2008 | Takahashi et al. | 60/285 |
| 7,640,728 B2 | * | 1/2010 | Yoshizaki et al. | 60/286 |

(Continued)

FOREIGN PATENT DOCUMENTS
EP    0 716 221    6/1996
(Continued)

OTHER PUBLICATIONS

Office Action issued Dec. 6, 2010, in China Patent Application No. 200780033821.3 (with English translation).

*Primary Examiner* — Quyen Leung
*Assistant Examiner* — John K Kim
(74) *Attorney, Agent, or Firm* — Oblon, Spivak, McClelland, Maier & Neustadt, L.L.P.

(57) ABSTRACT

In a V-type six cylinder engine, cylinder groups are provided in which a plurality of cylinders are arranged divided into left and right first and second banks. An intake pipe, a first exhaust pipe, and a second exhaust pipe are connected to the cylinder groups of the banks. A first upstream three-way catalyst and a first control valve are provided in one exhaust pipe while a second upstream three-way catalyst and a second control valve are provided in the other exhaust pipe. The exhaust pipes are communicated together upstream of the upstream three-way catalysts and the control valves by a communicating pipe. A third control valve that adjusts the flowrate of exhaust gas is provided in the communicating pipe.

21 Claims, 9 Drawing Sheets

U.S. PATENT DOCUMENTS

| | | | |
|---|---|---|---|
| 7,753,039 B2 * | 7/2010 | Harima et al. | 123/676 |
| 7,971,427 B2 * | 7/2011 | Sugiyama | 60/286 |
| 2007/0193564 A1 * | 8/2007 | Takahashi et al. | 123/568.2 |
| 2007/0294999 A1 * | 12/2007 | Yoshizaki et al. | 60/274 |
| 2010/0011762 A1 * | 1/2010 | Hokuto et al. | 60/602 |

FOREIGN PATENT DOCUMENTS

| | | |
|---|---|---|
| EP | 1 180 583 | 2/2002 |
| EP | 1 344 908 | 9/2003 |
| EP | 1 662 109 | 5/2006 |
| JP | 1 173423 | 12/1989 |
| JP | 3 286135 | 12/1991 |
| JP | 8 121153 | 5/1996 |
| JP | 8 189388 | 7/1996 |
| JP | 3635923 | 4/2005 |
| JP | 2005-315109 | 11/2005 |
| JP | 2006 153000 | 6/2006 |
| WO | 2006 049309 | 5/2006 |

* cited by examiner

INTERNAL COMBUSTION ENGINE AND CONTROL METHOD THEREOF

BACKGROUND OF THE INVENTION

1. Field of the Invention

The invention relates to an internal combustion engine having two cylinder groups in which a plurality of cylinders are arranged divided into two banks, and upstream sides of exhaust passages of the cylinder groups are connected together by a communicating passage, and as well as to a control method for the internal combustion engine.

2. Description of the Related Art

In a typical V-type multiple cylinder engine, a cylinder block has two banks on its upper portion that are angled at a predetermined angle, with a plurality of cylinders provided in each bank, thereby forming two cylinder groups. Pistons are movably fitted in the plurality of cylinders provided in each bank. The pistons are all connected to a crankshaft that is rotatably supported at a lower portion. Also, combustion chambers are formed by a cylinder head being fastened onto the upper portion of each bank of the cylinder block. An intake port which can be opened and closed by an intake valve, and an exhaust port which can be opened and closed by an exhaust valve, lead into and out of each combustion chamber. An intake pipe is connected to the intake ports of each bank while exhaust pipes are connected to the exhaust ports of each bank. An upstream control catalyst is mounted in these exhaust pipes, and a downstream control catalyst is mounted in an exhaust gas merger pipe into which the two exhaust pipes merge.

In this kind of a V-type multiple cylinder engine, in order to warm up the upstream control catalyst to activate it early on when the engine is started at a low temperature, bank control is made possible by providing communication between the two exhaust pipes with a communicating pipe upstream of the upstream control catalyst and providing a control valve in each exhaust pipe. Accordingly, when the engine is started at a low temperature, the control valve in one of the exhaust pipes is closed, which forces the exhaust gas from the bank on the side with the closed control valve to flow through the communicating pipe and into the other exhaust pipe, where it merges with the exhaust gas from the bank on the other side. The heat from this large amount of exhaust gas efficiently warms the upstream control catalyst, thus enabling it to be activated early on.

Also, with this kind of V-type multiple cylinder engine, a turbocharger is provided for only one of the banks. In this case, when the turbocharger is operating, the control valve in the exhaust pipe without the turbocharger is closed, which forces the exhaust gas from the bank on the side with the closed control valve to flow through the communicating pipe and into the exhaust pipe with the turbocharger, where it merges with the exhaust gas from that side. This large amount of exhaust gas drives a turbine in the turbocharger, which in turn drives a compressor that is integrated with the turbine and compresses air. Introducing this compressed air into the combustion chamber enables a large pressure boost to be obtained as well as suppresses thermal degradation of the upstream control catalyst on the side of the exhaust pipe without the turbocharger.

Moreover, when the downstream control catalyst mounted in the exhaust gas merger pipe is a $NO_X$ storage reduction catalyst that stores $NO_X$ in the exhaust gas when the air-fuel ratio is lean and releases the stored $NO_X$ when the air-fuel ratio is rich, and reduces the released $NO_X$ using an added reducing agent (fuel), the $NO_X$ purifying efficiency drops when sulfur components in the exhaust are stored. Therefore, controlling the banks such that the exhaust gas from the cylinder group of one bank is lean (i.e., the exhaust gas air-fuel ratio is lean) and the exhaust gas from the cylinder group of the other bank is rich (i.e., the exhaust gas air-fuel ratio is rich) enables sulfur components accumulated in the $NO_X$ storage reduction catalyst to be released and the $NO_X$ storage reduction catalyst to be recovered using an oxidation exothermic reaction that takes place when the lean exhaust gas and the rich exhaust gas merge just upstream of the $NO_X$ storage reduction catalyst.

Japanese Patent Application Publication No. 08-121153 (JP-A-08-121153) describes such an internal combustion engine.

In a V-type multiple cylinder engine, combustion in the cylinders takes place at predetermined intervals and the force generated by this combustion (i.e., engine output) differs depending on the operating state of the engine. Therefore, positive pressure waves of the exhaust gas reach the exhaust pipes that are connected to the cylinder groups of the two banks. A plurality of these positive pressure waves transmitted inside the exhaust pipes generate exhaust gas pulsations inside the communicating pipe. These exhaust gas pulsations that are generated in the communicating pipe prevent the exhaust gas in the combustion chamber from discharging properly into the exhaust pipes through the exhaust ports such that some of the exhaust gas remains in the cylinders. This adversely effects combustion, causes knocking, and adversely effects fuel efficiency and output.

Also, in an engine provided with a turbocharger for one bank, depending on the operating state of the engine, the pressure of the exhaust gas upstream of the turbine may become higher than the pressure (boost pressure) of the intake air downstream of the compressor, which increases the amount of residual gas in the combustion chamber and adversely effects combustion, as described above, so the good capability of the turbocharger cannot be realized. In an engine provided with a $NO_X$ storage reduction catalyst, the lean exhaust gas from the cylinder group in one bank ends up merging with the rich exhaust gas from the cylinder group of the other bank in the communicating pipe due to the exhaust gas pulsations generated in the communicating pipe. As a result, not only does an oxidation reaction take place inside the communicating pipe, thus generating heat there, but the oxidation exothermic reaction in the $NO_X$ storage reduction catalyst is insufficient which prevents the sulfur components accumulated in the $NO_X$ storage reduction catalyst from being properly released.

SUMMARY OF THE INVENTION

This invention thus provides an internal combustion engine which is capable of good bank control, and suppresses deterioration of combustion by reducing the amount of residual gas, suppresses knocking, and suppresses deterioration of fuel efficiency and output by suppressing adverse effects caused by exhaust gas pulsations generated in a communicating pipe that provides communication between exhaust passages of two banks. The invention also provides a control method for the internal combustion engine.

A first aspect of the invention relates to an internal combustion engine that includes two cylinder groups in which a plurality of cylinders are arranged divided into two banks; an intake passage provided for the cylinder groups; an exhaust passage provided separately for each cylinder group; an exhaust gas control valve that is provided in each exhaust passage and adjusts a flowrate of exhaust gas; a control catalyst provided in at least one of the exhaust passages; a communicating passage that provides communication between the exhaust passages upstream of the control valves and the control catalyst; and a communication control valve that is provided in the communicating passage and adjusts the flow-rate of the exhaust gas.

In the first aspect, the exhaust gas control valve may be provided downstream of the control catalyst.

In the first aspect, the communication control valve may be provided in plurality in the communicating passage, one near each exhaust passage.

In the first aspect, a supercharger may also be provided upstream of the control catalyst in one of the exhaust passages of the two cylinder groups.

In the foregoing structure, the communication control valve may be provided in the communicating passage in a position near the exhaust passage on the side with the cylinder group having the supercharger.

In the foregoing structure, a control portion may also be provided that selectively opens and closes the communication control valve according to an operating state of the internal combustion engine.

In the foregoing structure, the control portion may open the communication control valve when the internal combustion engine is operating at a high load, and an exhaust gas pressure upstream of a turbine of the supercharger is greater than a boost pressure downstream of a compressor of the supercharger.

In the foregoing structure, the control portion may close the communication control valve when the internal combustion engine is operating at a high load, and an exhaust gas pressure upstream of a turbine of the supercharger is less than a boost pressure downstream of a compressor of the supercharger.

In the foregoing structure, the control portion may close the communication control valve when the internal combustion engine is operating at a low speed and a high load.

In the foregoing structure, the control portion may close the communication control valve during bank control in which one of the two cylinder groups is operated with a lean air-fuel ratio and the other of the two cylinder groups is operated with a rich air-fuel ratio.

In the foregoing structure, the control portion may open the communication control valve when the operating state of the internal combustion engine is not within an operating region in which the bank control is possible.

In the foregoing structure, when the operating state of the internal combustion engine falls outside of the operating region in which the bank control is possible, the control portion may change the air-fuel ratios of the two cylinder groups to a stoichiometric air-fuel ratio and open the communication control valve.

In the foregoing structure, when the operating state of the internal combustion engine falls outside of the operating region in which the bank control is possible, the control portion may change the air-fuel ratios of the two cylinder groups to a stoichiometric air-fuel ratio, and after a predetermined period of time which is set in advance has passed, open the communication control valve.

In the foregoing structure, the internal combustion engine may also include an exhaust gas merger passage into which the downstream end portions of the exhaust passages merge, and a $NO_X$ storage reduction catalyst provided in the exhaust gas merger passage. Further, the control portion may execute the bank control when a sulfur component stored in the $NO_X$ storage reduction catalyst has become greater than a preset stored sulfur amount. Also, the control portion may execute the bank control when a sulfur component stored in the $NO_X$ storage reduction catalyst has become greater than a preset stored sulfur amount, and a temperature of the $NO_X$ storage reduction catalyst is within a predetermined temperature range.

In the foregoing structure, when the internal combustion engine is operating at a high loads the control portion may open the exhaust gas control valve and selectively open and close the communication control valve.

In the foregoing structure, during startup of the internal combustion engine, the control portion may opens the communication control valve and one of the exhaust gas control valve, and closes the other exhaust gas control valve. Also, when the control catalyst provided in the exhaust passage in which the exhaust gas control valve is open is activated, the control portion may open the communication control valve and the exhaust gas control valves and make the air-fuel ratios of the cylinder groups of the two banks stoichiometric.

As a method for controlling the internal combustion engine according to the foregoing structure, the communication control valve may be selectively opened and closed according to the operating state of the internal combustion engine.

In this control method, the communication control valve may be opened when the internal combustion engine is operating at a high load, and an exhaust pressure upstream of a turbine of the supercharger is greater than a pressure boost downstream of a compressor of the supercharger. Further, the communication control valve may be closed when the internal combustion engine is operating at a high load, and an exhaust pressure upstream of a turbine of the supercharger, is less than a pressure boost downstream of a compressor of the supercharger. Also, the communication control valve may be closed when the internal combustion engine is operating at a low speed and high load. Also, the communication control valve may be closed during bank control in which one of the two cylinder groups is operated with a lean air-fuel ratio and the other of the two cylinder groups is operated with a rich air-fuel ratio.

According to the foregoing structure, exhaust gas pulsations transmitted through a communicating passage from the exhaust passage of one bank to the exhaust passage of the other bank are reduced by selectively opening and closing a communication control valve in addition to an exhaust gas control valve according to the operating state of the internal combustion engine. As a result, it is possible to achieve good bank control as well as suppress deterioration of combustion by reducing the amount of residual gas, suppress knocking, and suppress deterioration of fuel efficiency and output by suppressing adverse effects from these exhaust gas pulsations.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

In the following description and the accompanying drawings, example embodiments of the internal combustion engine according to the invention will be described in more detail with reference to the accompanying drawings. It is to be understood, however, that the invention is not limited to these example embodiments.

Figure 1:
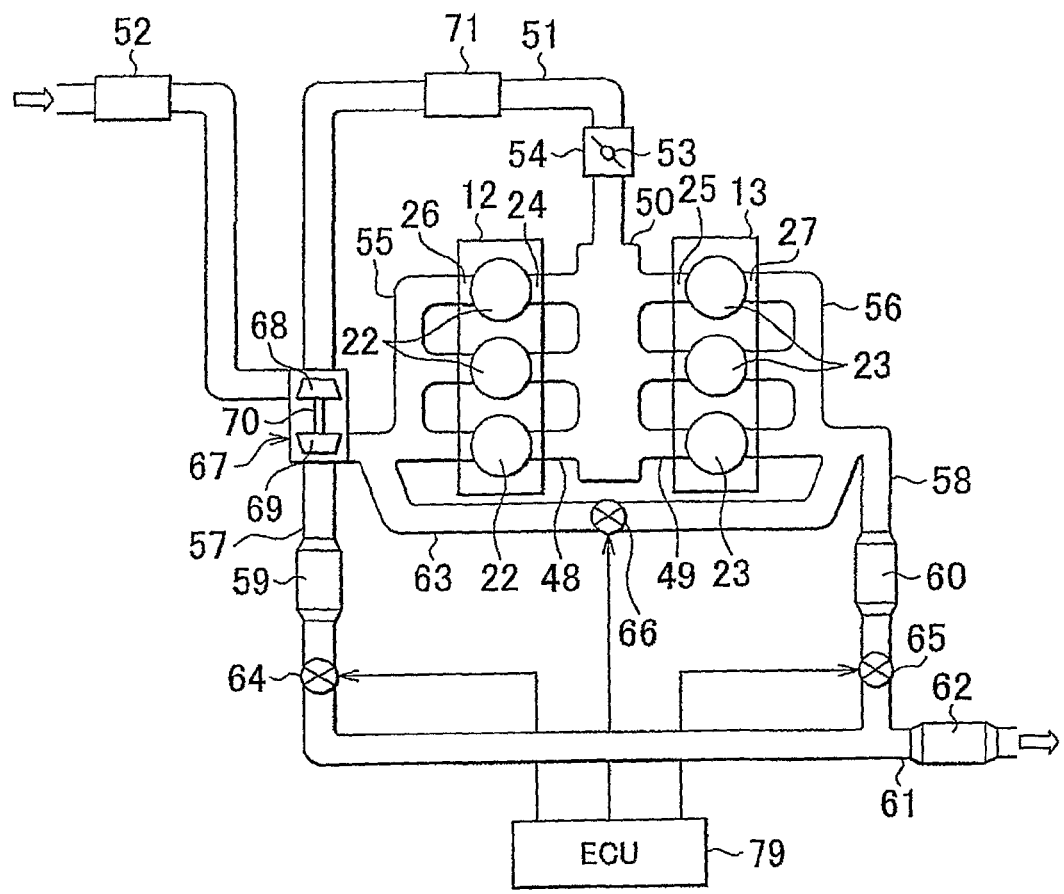
FIG. 1 is a plan view schematically showing a V-type six cylinder engine, which representative of an internal combustion engine, according to a first example embodiment of the invention.
Figure 2:
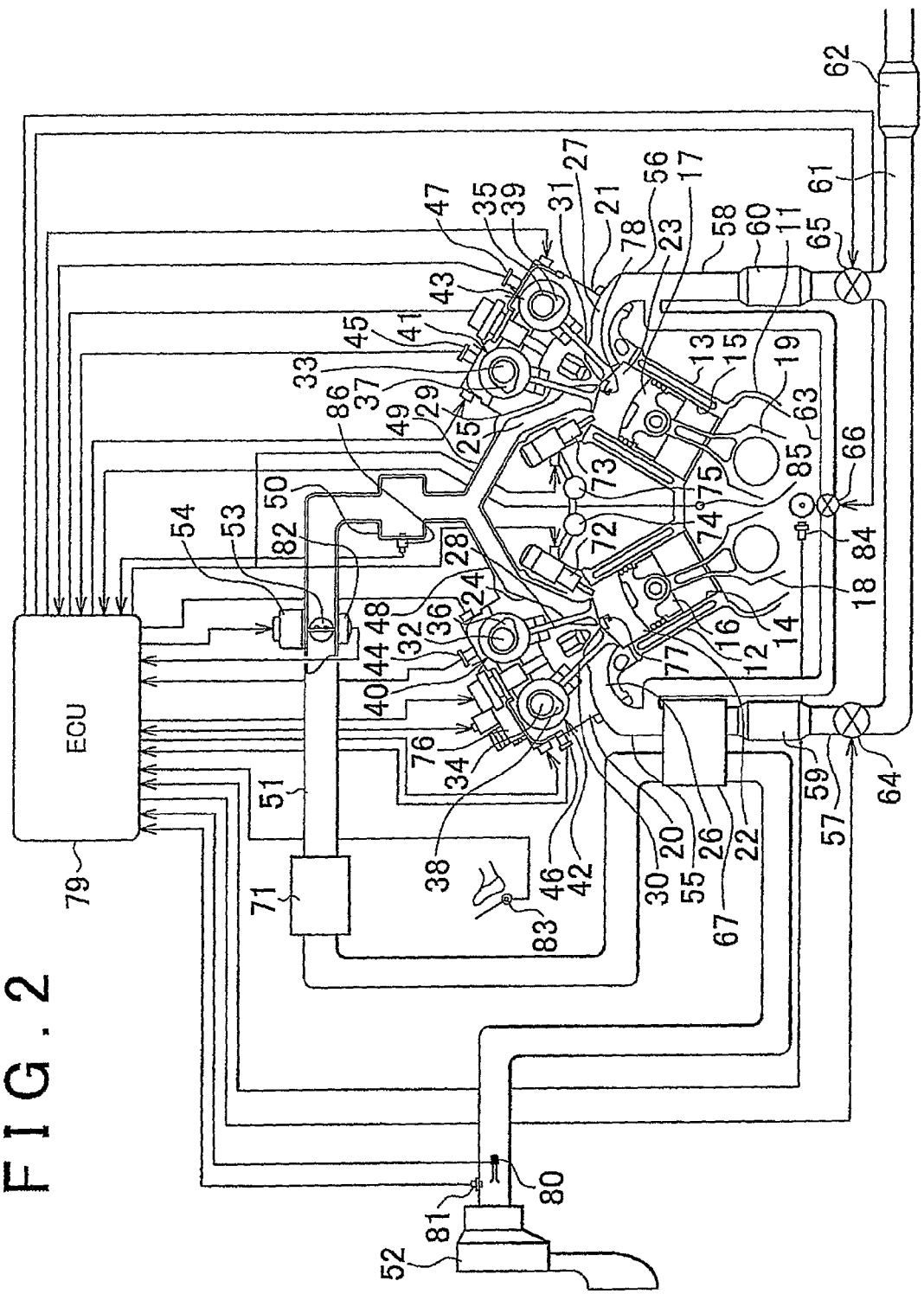
FIG. 2 is a sectional view schematically showing the V-type six cylinder engine of the first example embodiment.

In a first example embodiment, a V-type six cylinder engine is used as the internal combustion engine. This V-type six cylinder engine has left and right first and second banks 12 and 13 angled at predetermined angles on the upper portion of cylinder block 11, as shown in FIGS. 1 and 2. Each bank is provided with a plurality of cylinders such that there are two cylinder groups. Each bank 12 and 13 has three cylinder bores 14 and 15, respectively. Pistons 16 and 17 are fitted in these cylinder bores 14 and 15 so as to be able to move up and down. A crankshaft, not shown, is rotatably supported at a lower portion of the cylinder block 11. Each piston 16 and 17 is connected to the crankshaft via a connecting rod 18 and 19.

Meanwhile, a cylinder head 20 and 21 is fastened onto the upper portion of each bank 12 and 13. The cylinder block 11, the pistons 16 and 17, and the cylinder heads 20 and 21 form combustion chambers 22 and 23. Input ports 24 and 25 and exhaust ports 26 and 27 are formed facing one another in the upper portion of the combustion chambers 22 and 23, i.e., in the lower surface of the cylinder heads 20 and 21. The lower end portions of intake valves 28 and 29 are positioned in the intake ports 24 and 25 and the lower end portions of exhaust valves 30 and 31 are positioned in the exhaust ports 26 and 27. These intake valves 28 and 29 and exhaust valves 30 and 31 are movably supported in the axial direction by the cylinder heads 20 and 21 and urged in a direction in which they close the intake ports 24 and 25 and exhaust ports 26 and 27, respectively. Also, intake camshafts 32 and 33 and exhaust camshafts 34 and 35 are rotatably supported on the cylinder heads 20 and 21 such that intake cams 36 and 37 contact the upper end portions of the intake valves 28 and 29 and exhaust cams 38 and 39 contact the upper end portions of the exhaust valves 30 and 31 via roller rocker arms, not shown.

Accordingly, when the intake camshafts 32 and 33 and the exhaust camshafts 34 and 35 rotate in synch with the engine, the intake cams 36 and 37 and the exhaust cams 38 and 39 move the roller rocker arms, thus making the intake valves 28 and 29 and the exhaust valves 30 and 31 move up and down at a predetermined timing. As the intake valves 28 and 29 and the exhaust valves 30 and 31 move up and down, the intake ports 24 and 25 and the exhaust ports 26 and 27 open and close, thereby allowing and preventing communication between the intake ports 24 and 25 and the combustion chambers 22 and 23, and between the exhaust ports 26 and 27 and the combustion chambers 22 and 23.

The valves mechanisms of this engine are formed by intake variable valve timing mechanisms 40 and 41 and exhaust variable valve timing mechanisms 42 and 43 which are variable valve mechanisms (hereinafter also referred to as "VVT" (Variable Valve Timing-intelligent)) that control the opening and closing timings of the intake valves 28 and 29 and the exhaust valves 30 and 31 to the optimum opening and closing timings according to the operating state. These intake variable valve timing mechanisms 40 and 41 and the exhaust variable valve timing mechanisms 42 and 43 are formed with VVT controllers provided on the end portions of the intake camshafts 32 and 33 and the exhaust camshafts 34 and 35, for example, and can advance or retard the opening and closing timings of the intake valves 28 and 29 and the exhaust valves 30 and 31 by changing the phases of the camshafts 32, 33, 34, and 35 with respect to cam sprockets using a hydraulic pump (or electric pump). In this case, the variable valve mechanisms 40, 41, 42, and 43 advance or retard the opening and closing timings while keeping the operating angle (i.e., the opening timing) of the intake valves 28 and 29 and the exhaust valves 30 and 31 constant. Also, cam position sensors 44, 45, 46, and 47 which detect the rotation phase of the intake camshafts 32 and 33 and the exhaust camshafts 34 and 35 are provided on those camshafts 32, 33, 34, and 35, respectively.

A surge tank 50 is connected via intake manifolds 48 and 49 to the intake ports 24 and 25 of the cylinder heads 20 and 21. Meanwhile, an air cleaner 52 is mounted to an air inlet of an intake pipe (i.e., intake passage) 51. An electronic throttle device 54 that has a throttle valve 53 is provided downstream of the air cleaner 52. The surge tank 50 is connected to the downstream end portion of this intake pipe 51.

Exhaust pipes 57 and 58 are connected via exhaust manifolds 55 and 56 to the exhaust ports 26 and 27. A first upstream three-way catalyst (control catalyst) 59 is mounted in the first exhaust pipe 57, while a second upstream three-way catalyst (control catalyst) 60 is mounted in the second exhaust pipe 58. The downstream end portions of the second exhaust pipes 57 and 58 are connected together, merging into an exhaust gas merger pipe 61. A $NO_X$ storage reduction catalyst (i.e., $NO_X$ storage reduction control catalyst) 62 is mounted in this exhaust gas merger pipe 61. These upstream three-way catalysts 59 and 60 serve to simultaneously purify HC, CO, and $NO_X$ in the exhaust gas by a redox (oxidation-reduction) reaction when the exhaust gas air-fuel ratio is at the stoichiometric air-fuel ratio. The $NO_X$ storage reduction catalyst 62 stores $NO_X$ in the exhaust gas when the exhaust gas air-fuel ratio is lean and releases the stored $NO_X$ when the engine is operating in the stoichiometric burn region or rich burn region in which the oxygen concentration in the exhaust gas is lower, and reduce the released $NO_X$ using fuel as an added reducing agent.

Also, the first exhaust pipe 57 and the second exhaust pipe 58 are communicated by a communicating pipe (i.e., a communicating passage) 63 upstream, in the direction in which exhaust gas flows, of the positions where the upstream three-way catalysts 59 and 60 are mounted. More specifically, one end portion of the communicating pipe 63 is connected to the portion where the exhaust manifold 55 is connected to the exhaust pipe 57 and the other end portion of the communicating pipe 63 is connected to the portion where the exhaust manifold 56 is connected to the exhaust pipe 58. A first control valve 64 and a second control valve 65, which serve as exhaust gas control valves, are mounted downstream, in the direction in which exhaust gas flows, of the upstream three-way catalysts 59 and 60 in the first exhaust pipe 57 and the second exhaust pipe 58. These first and second control valves 64 and 65 are flowrate control valves that can regulate the flowrate of exhaust gas flowing through the exhaust pipes 57 and 58 by adjusting their opening amounts. Also, a third control valve 66 that serves as a communication control valve is mounted in an intermediate position, in the length direction, in the communicating pipe 63. This third control valve 66 is a flowrate control valve that can regulate the flowrate of exhaust gas that flows through the communicating pipe 63 by adjusting its opening amount.

A turbocharger 67 is provided on the first bank 12 side. This turbocharger 67 is structured such that a compressor 68 provided on the intake pipe 51 side and a turbine 69 provided on the exhaust pipe 57 side are integrally connected by a connecting shaft 70. In this case, the turbine 69 of the turbocharger 67 can be driven by exhaust gas flowing through the first exhaust pipe 57 on the first bank 12 side. The end portion of the communicating pipe 63 is connected to the first exhaust pipe 57 upstream of the portion where the turbine 69 is provided. Also, an intercooler 71 that cools intake air that has been compressed and heated by the compressor 68 is provided in the intake pipe 51 downstream of the compressor 68 of the turbocharger 67 and upstream of the electronic throttle device 54 (throttle valve 53).

Accordingly, the turbine 69 of the turbocharger 67 provided for the first bank 12 is driven by exhaust gas discharged from the combustion chambers 22 of the first bank 12 into the first exhaust pipe 57 via the exhaust ports 26 and the exhaust manifold 55. As the turbine 69 rotates, it drives the compressor 68 that is connected to it by the connecting shaft 70. When driven, this compressor 68 compresses air that will flow through the intake pipe 51. Therefore, the air that is introduced from the air cleaner 52 into the intake pipe 51 is first compressed by the turbocharger 67 and then cooled by the intercooler 71, after which it is then introduced into the surge tank 50 and drawn into the combustion chambers 22 and 23 via the intake manifolds 48 and 49 and the intake ports 24 and 25 of the bank 12 and 13.

Fuel injectors 72 and 73 that inject fuel (gasoline) directly into the combustion chambers 22 and 23 are mounted to the cylinder heads 20 and 21. These fuel injectors 72 and 73 are connected to delivery pipes 74 and 75. Fuel can be supplied to these delivery pipes 74 and 75 at a predetermined pressure from a high pressure fuel pump 76. Also, spark plugs 77 and 78 that ignite the air-fuel mixture are mounted in positions above the combustion chambers 22 and 23 to the cylinder heads 20 and 21.

An electronic control unit (ECU) 79 is also provided in the vehicle. This ECU 79 can control the fuel injection timing of the fuel injectors 72 and 73 and the ignition timing of the spark plugs 77 and 78 and the like. The ECU 79 sets the fuel injection quantity, the injection timing, and the ignition timing and the like based on the engine operating state such as the detected intake air amount, the intake air temperature, the throttle opening amount, the accelerator depression amount, the engine speed, and the coolant temperature, and the like. That is, an airflow sensor 80 and an intake air temperature sensor 81 are mounted on the upstream side, of the intake pipe 51 and output signals indicative of the measured intake air amount and the intake air temperature to the ECU 79. Also, a throttle position sensor 82 is provided on the electronic throttle device 54, and an accelerator position sensor 83 is provided on an accelerator pedal. This throttle position sensor 82 and the accelerator position sensor 83 output signals indicative of the current throttle opening amount and the accelerator opening amount to the ECU 79. Further, a crank angle sensor 84 is provided on the crankshaft and outputs a signal indicative of the detected crank angle to the ECU 79. The ECU 79 then calculates the engine speed based on the crank angle. Also, a coolant temperature sensor 85 is provided on the cylinder block 11 and outputs a signal indicative of the detected engine coolant temperature to the ECU 79.

Also, the ECU 79 can control the intake variable valve mechanisms 40 and 41 and the exhaust variable valve mechanisms 42 and 43 based on the operating state of the engine. That is, at low temperatures, during startup, when idling, or when operating at a light load, combustion can be stabilized and fuel efficiency improved by reducing the amount of exhaust gas blown back into the intake ports 24 and 25 or the combustion chambers 22 and 23, which is done by eliminating overlap between the opening timing of the exhaust valves 30 and 31 and the opening timing of the intake valves 28 and 29. Also, increasing this overlap when operating at a medium load improves exhaust gas purifying efficiency by increasing the internal EGR rate, as well as improves fuel efficiency by reducing pumping loss. Moreover, advancing the closing timing of the intake valves 28 and 29 when the engine is operating at a high load and a low or medium speed improves volumetric efficiency by reducing the amount intake air blown back into the intake ports 24 and 25. Also, retarding the closing timing of the intake valves 28 and 29 to match the engine speed when the engine is operating at a high load and high speed improves volumetric efficiency as a valve timing suitable for the inertia force of the intake air.

In the V-type six cylinder engine in this example embodiment, as described above, the first upstream three-way catalyst 59 and the first control valve 64 are mounted in the first exhaust pipe 57, and the second upstream three-way catalyst 60 and the second control valve 65 are mounted in the second exhaust pipe 58. Also, the first and second exhaust pipes 57 and 58 are communicated with each other by the communicating pipe 63 upstream of the upstream three-way catalysts 59 and 60. Accordingly, various bank controls are possible by changing the combustion states of the banks 12 and 13 and the discharge flow paths of the exhaust gas.

When the engine is started at a low temperature, for example, the first control valve 64 is closed while the second control valve 65 is open such that exhaust gas that was discharged from the cylinder group of the first bank 12 into the first exhaust pipe 57 is diverted so that it flows through the communicating pipe 63 and into the second exhaust pipe 58 where it merges with the exhaust gas from the cylinder group of the second bank 13. Once merged, this large amount of exhaust gas then flows into the second upstream three-way catalyst 60, thus warming the second upstream three-way catalyst 60. Once the second three-way catalyst 60 has finished warming up and is activated, the first and second control valves 64 and 65 open such that neither exhaust gas from the bank 12 nor the exhaust gas from the bank 13 do not flow through the communicating pipe 63. Instead the exhaust gas from the bank 12 flows through the exhaust pipe 57 and exhaust gas from the bank 13 flows through the exhaust pipe 58, after which the exhaust gases merge at the exhaust gas merger pipe 61. Once merged, the exhaust gas flows into the $NO_X$ storage reduction catalyst 62 where it is purified.

Also, in the V-type cylinder engine in this example embodiment, when the engine is operating at a high load, the first control valve 64 is open while the second control valve 65 is closed such that exhaust gas that was discharged from the cylinder group of the second bank 13 into the second exhaust pipe 58 is diverted so that it flows through the communicating pipe 63 and into the first exhaust pipe 57 where it merges with the exhaust gas from the cylinder group of the first bank 12. Once merged, this large amount of exhaust gas then flows into the turbocharger 67 which it drives with great efficiency, thereby making a large pressure boost possible. Meanwhile, thermal degradation of the second upstream three-way catalyst 60 mounted in the second exhaust pipe 58 for the cylinder group of the second bank 13 which is not provided with a turbocharger is able to be suppressed.

Moreover, for example, the exhaust gas from the cylinder group of the first bank 12 is made lean and the exhaust gas from the cylinder group of the second bank 13 is made rich. Incidentally, in this specification, exhaust gas with a lean air-fuel ratio may also be referred to as "lean exhaust gas", exhaust gas with a rich air-fuel ratio may also be referred to as "rich exhaust gas", and exhaust gas with a stoichiometric air-fuel ratio may also be referred to as "stoichiometric exhaust gas". Meanwhile, the first control valve 64 and the second control valve 65 are opened so that the lean exhaust gas discharged from the cylinder group of the first bank 12 flows into the first exhaust pipe 57 and the rich exhaust gas discharged from the cylinder group of the second bank 13 flows into the second exhaust pipe 58. The rich and lean exhaust gases then merge at the exhaust gas merger pipe 61. The resultant oxidation exothermic reaction that takes place in the $NO_X$ storage reduction catalyst 62 is used to warm up the $NO_X$ storage reduction catalyst 62 and release the sulfur components accumulated in the $NO_X$ storage reduction catalyst 62, thereby recovering the $NO_X$ storage reduction catalyst 62.

In a typical V-type multiple cylinder engine, combustion in the cylinders takes place at predetermined intervals and the force generated by this combustion (i.e., the engine output) differs depending on the operating state of the engine. As a result, a plurality of positive pressure waves of the exhaust gas reach the exhaust pipes 57 and 58 that are connected to the cylinder groups of the first and second banks 12 and 13. This plurality of positive pressure waves transmitted inside the exhaust pipes 57 and 58 generate exhaust gas pulsations inside the communicating pipe 63. These exhaust gas pulsations that are generated in the communicating pipe 63 prevent the exhaust gas in the combustion chambers 22 and 23 from discharging properly into the exhaust pipes 57 and 58 through the exhaust ports 26 and 27, and as a result, some of the exhaust gas remains in the combustion chambers 22 and 23. This adversely effects combustion, causes knocking, and adversely effects fuel efficiency and output.

In particular, when the engine is operating at a high speed and high load, the pressure of the exhaust gas upstream of the turbine 69 may become higher than the pressure of the intake air (i.e., the boost pressure) downstream of the compressor 68 due to the turbocharger 67, which increases the amount of residual gas in the combustion chambers 22 and 23 and adversely effects combustion so the good capability of the turbocharger 67 cannot be realized.

Therefore, in the engine of the first example embodiment, as described above, the third control valve 66 is mounted in the communicating pipe 63, and the ECU 79, which serves as a control portion, controls this third control valve 66 open and closed according to the operating state of the engine, thus reducing the various adverse effects that are caused by exhaust gas pulsations.

Figure 3:
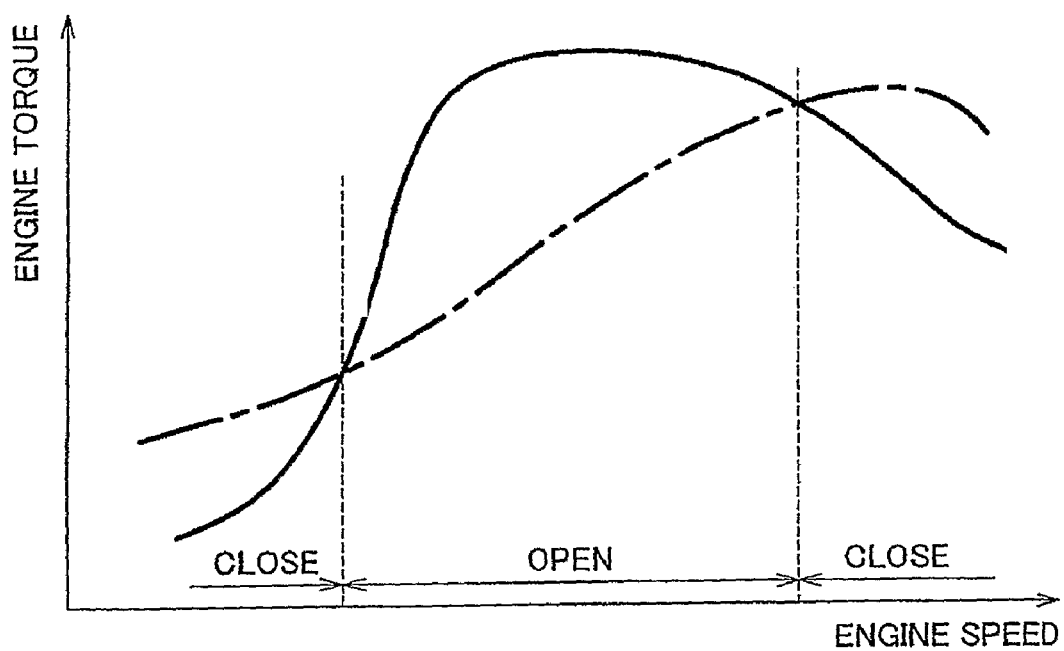
FIG. 3 is a control map for controlling a third control valve in the V-type six cylinder engine of the first example embodiment open and closed.

In FIG. 3, the dotted line shows the full load performance when the third control valve 66 is closed and the solid line shows the full load performance when the third control valve 66 is open. More specifically, as shown in FIG. 3, the open/close control of the third control valve 66 according to the operating state of the engine is such that the ECU 79 closes the third control valve 66 in the low speed, high load region of the engine where the turbocharger 67 operates effectively. In the mid speed, high load region of the engine, the ECU 79 opens the third control valve 66 when the pressure of the exhaust gas upstream of the turbine 69 of the turbocharger 67 is higher than the pressure of the intake air (i.e., the boost pressure) downstream of the compressor 68. Also, in the high speed, high load region of the engine, the ECU 79 closes the third control valve 66 when the pressure of the exhaust gas upstream of the turbine 69 of the turbocharger 67 is lower than the pressure of the intake air (i.e., the boost pressure) downstream of the compressor 68. In this case, the pressure of the intake air (i.e., the boost pressure) downstream of the compressor 68 of the turbocharger 67 is detected by a boost pressure sensor 86 provided in the surge tank 50. The pressure of the exhaust gas upstream of the turbine 69 may be estimated by the detected value from the boost pressure sensor 86 and the engine speed.

Here, the open/close control of the control valves 64, 65, and 66 in the V-type six cylinder engine in the first example embodiment will be described.

As shown in FIGS. 1 and 2, air that has been drawn into the intake pipe 51 through the air cleaner 52 is compressed by the compressor 68 of the turbocharger 67 provided on the first bank 12 side. This supercharged intake air is then adjusted by the throttle valve 53, after which it flows into the surge tank 50 and then into the intake ports 24 and 25 via the intake manifolds 48 and 49. When the intake valves 28 and 29 open, the air in the intake ports 24 and 25 is drawn into the combustion chambers 22 and 23. The fuel injectors 72 and 73 then inject a predetermined amount of fuel into the combustion chambers 22 and 23 either during this intake stroke or during the compression stroke in which the pistons 16 and 17 rise in the cylinders thereby compressing the air that was drawn in. The mist-like fuel and the high pressure air mix to form an air-fuel mixture that combusts when ignited by the spark plugs 77 and 78. The force generated by this combustion forces the pistons 16 and 17 down, outputting driving force. Meanwhile, when the exhaust valves 30 and 31 open, the exhaust gas in the combustion chambers 22 and 23 is discharged from the exhaust ports 26 and 27, through the exhaust manifolds 55 and 56, and into the first and second exhaust pipes 57 and 58. The exhaust gas that was discharged into the first exhaust pipe 57 drives the turbine 69 of the turbocharger 67, which in turn drives the compressor 68 that is connected to the turbine 69 by the connecting shaft 70. As the compressor 68 is driven, it compresses air that was introduced into the intake pipe 51.

Then, the exhaust gas that is discharged from the combustion chambers 22 in the first bank 12 into the first exhaust pipe 57 through the exhaust ports 26 and the exhaust manifold 55 warms up the first upstream three-way catalyst 59, thus activating it so that it purifies the harmful components in the exhaust gas. After being purified by the upstream three-way catalyst 59, the exhaust gas then flows into the exhaust gas merger pipe 61. Meanwhile, the exhaust gas that is discharged from the combustion chambers 23 in the second bank 13 into the second exhaust pipe 58 through the exhaust ports 27 and the exhaust manifold 56 warms up the second upstream three-way catalyst 60, thus activating it so that it purifies the harmful components in the exhaust gas. After being purified by the upstream three-way catalyst 60, the exhaust gas then flows into the exhaust gas merger pipe 61. The exhaust gas that flows into the exhaust gas merger pipe 61 then warms up the $NO_X$ storage reduction catalyst 62, thereby activating it so that it properly purifies any residual harmful components, after which the exhaust gas is released into the atmosphere.

Also, during startup of the engine, the first control valve 64 is closed while the second control valve 65 and the third control valve 66 are open. As a result, the exhaust gas discharged from the first bank 12 into the first exhaust pipe 57 is diverted so that it flows through the communicating pipe 63 and into the second exhaust pipe 58 where it merges with the exhaust gas from the cylinder group of the second bank 13. The resultant large amount of exhaust gas then flows into the second upstream three-way catalyst 60 and warms it up.

Then once the second upstream three-way catalyst 60 has finished warming up and is activated, the first, second, and third control valves 64, 65, and 66 open and the air-fuel ratio of the exhaust gas from the cylinder groups of the banks 12 and 13 is made stoichiometric.

Also, when the engine is operating at a high load, the third control valve 66 is opened and closed while the first and second control valves 64 and 65 are open.

Figure 4:
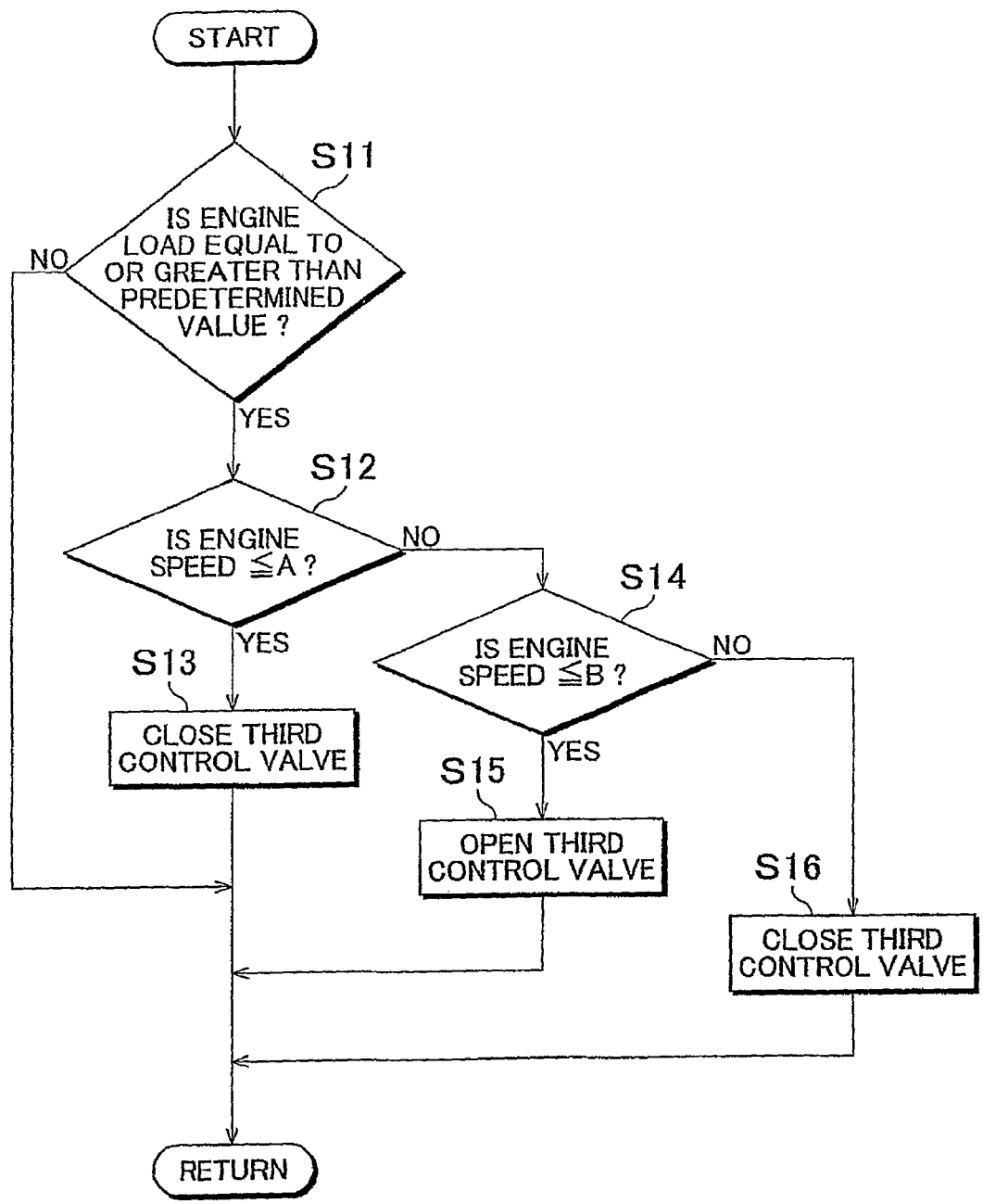
FIG. 4 is a flowchart related to open/close control of the third control valve in the V-type six cylinder engine of the first example embodiment.

In the open/close control of the third control valve of the V-type six cylinder engine in the first example embodiment, as shown in FIG. 4, it is first determined in step S11 whether the current engine load is equal to or greater than a predetermined value that is set in advance. In this example embodiment, the open/close control of the third control valve 66 is executed only when the engine load is in the high load region so if it is determined in step S11 that the engine load is lower than the predetermined value, this cycle of the routine immediately ends without any other steps being taken. Incidentally, the engine load may be indicated by a parameter such as the accelerator depression amount, the throttle opening amount, the intake air amount, the fuel injection quantity or a combination of these.

If, on the other hand, it is determined in step S11 that the engine load is equal to or greater than the predetermined value, then it is determined in step S12 whether the current engine speed is equal to or less than a low speed determining value A (such as 1500 rpm) that was set in advance. If it is determined here that the engine speed is equal to or less than this low speed determining value A, the ECU 79 closes the third control valve 66 in step S13. As a result, the communicating pipe 63 is closed off by the third control valve 66 so exhaust gas that is discharged from the cylinder groups of the first and second banks 12 and 13 flows through the exhaust pipes 57 and 58 and merges at the exhaust gas merger pipe 61. Accordingly the pulsations of the exhaust gas in one of the cylinder groups are not transmitted to the other cylinder group, so the amount of residual exhaust gas (internal EGR gas) in the combustion chambers 22 and 23 is reduced without. That is, the turbocharger 67 does not operate effectively in the low speed, high load region so when the communicating pipe 63 is closed off while the engine is operating at a low speed and high load, the turbine 69 becomes resistance for the exhaust gas that is discharged from the first bank 12 provided with the turbocharger 67. As a result, the discharge of exhaust gas through the first exhaust pipe 57 is impeded. However, with the second bank 13 for which no turbocharger is provided, exhaust gas is easily discharged through the second exhaust pipe 58 so the amount of internal EGR gas decreases. Also, performance and fuel efficiency are increased by increasing the amount of overlap between the opening timing of the exhaust valves 30 and 31 and the opening timing of the intake valves 28 and 29, increasing the actual compression ratio, and stabilizing combustion.

If, on the other hand, it is determined in step S12 that the engine speed is higher than the low speed determining value A, then it is determined in step S14 whether the current engine speed is equal to or less than a high speed determining value B (such as 4000 rpm) which is set in advance. If it is determined here that the engine speed is equal to or less than this high speed determining value B, than the ECU 79 opens the third control valve 66 in step S15. As a result, the communicating pipe 63 is opened by the third control valve 66 such that exhaust gas discharged from the cylinder groups of the first and second banks 12 and 13 both flows through the communicating pipe 63 and merges, as well as flows through the exhaust pipes 57 and 58 and merges at the exhaust gas merger pipe 61, such that the amount of residual exhaust gas (internal EGR gas) in the combustion chambers 22 and 23 decreases. That is, when the engine is operating at a mid speed and high load where the turbocharger 67 operates effectively, the pressure of the exhaust gas upstream of the turbine 69 of the turbocharger 67 becomes higher than the pressure of the intake air downstream of the compressor on the first bank 12 side on which the turbocharger 67 is provided. Then by increasing the amount of overlap between the opening timing of the exhaust valves 30 and 31 and the opening timing of the intake valves 28 and 29, the exhaust gas is discharged more easily through the second exhaust pipe 58. The discharge effect of this exhaust gas also spreads to the second bank side through the communicating pipe 63. Large engine output can then be ensured by setting the ignition timing to the optimum value without retarding it.

Also, if it is determined in step S14 that the engine speed is greater than the high speed determining value B, then the ECU 79 closes the third control valve 66 in step S16. As a result, the communicating pipe 63 is closed off by the third control valve 66 so the exhaust gas discharged from the cylinder groups of the first and second banks 12 and 13 flows through the exhaust pipes 57 and 58 and merges at the exhaust gas merger pipe 61. Therefore the pulsations of the exhaust gas in one cylinder group are not transmitted to the other cylinder group, so the amount of internal EGR gas decreases. That is, the turbocharger 67 does not operate effectively in the high speed, high load region so when the communicating pipe 63 is closed off while the engine is operating at a low speed and high load, the pressure of the exhaust gas upstream of the turbine 69 of the turbocharger 67 becomes lower than the pressure of the intake air downstream of the compressor 68 with the first bank 12 having the turbocharger 67. However, with the second bank 13 for which no turbocharger is provided, the pressure of the exhaust gas upstream of the turbine 69 of the turbocharger 67 becomes greater than the pressure of the intake air downstream of the compressor 68. Therefore, the amount of overlap between the opening timing of the exhaust valves 30 and 31 and the opening timing of the intake valve 28 and 29 is increased such that exhaust gas is more easily discharged through the second exhaust pipe 58. Also, setting the ignition timing to an optimum value without delaying it enables large engine output to be ensured, while performance and fuel efficiency are improved by stabilizing combustion.

In this way, with the V-type six cylinder engine which is the internal combustion engine of the first example embodiment, the cylinder groups are provided in which a plurality of cylinders are arranged divided into the first bank 12 and the left bank 13. The intake pipe 51 as well as the first exhaust pipe 57 and the second exhaust pipe 58 are connected to the cylinder groups of the banks 12 and 13. The first upstream three-way catalyst 59 and the first control valve 64 are provided in the exhaust pipe 57 and the second upstream three-way catalyst 60 and the second control valve 65 are provided in the exhaust pipe 58. The exhaust pipes 57 and 58 are communicated with each other upstream of the upstream three-way catalysts 59 and 60 by the communicating pipe 63 in which is provided the third control valve 66 that adjusts the flowrate of the exhaust gas in the communicating pipe 63. The ECU 79 opens and closes the third control valve 66 according to the operating state of the engine.

Accordingly, by opening and closing not only the first and second control valves 64 and 65 but also the third control valve 66 according to the operating state of the engine, exhaust gas pulsations that are transmitted from the exhaust pipe of one bank to the exhaust pipe of the other bank through the communicating pipe 63 are reduced. As a result, it is possible to achieve good bank control, as well as suppress deterioration of combustion by reducing the amount of residual gas, suppress knocking, and suppress deterioration of fuel efficiency and output by suppressing the adverse effects from the exhaust gas pulsations.

More specifically, the ECU 79 closes the third control valve 66 when the engine is operating in the low speed, high load region where the turbocharger 67 operates effectively. The ECU 79 opens the third control valve 66 when the pressure of the exhaust gas upstream of the turbine 69 of the turbocharger 67 is higher than the pressure of the intake air (i.e., the boost pressure) downstream of the compressor 68 when the engine is operating in the mid speed, high load region. The ECU 79 closes the third control valve 66 when the pressure of the exhaust gas upstream of the turbine 69 of the turbocharger 67 is lower than the pressure of the intake air (i.e., the boost pressure) downstream of the compressor 68 when the engine is operating in the high speed, high load region.

Accordingly, closing the third control valve 66 when the engine is operating in the low speed, high load region prevents the exhaust gas pulsations from being transmitted, thus ensuring the performance of the cylinder group of the second bank 13 not provided with a turbocharger. Opening the third control valve 66 when the engine is operating in the mid speed, high load region ensures the performance of the cylinder group of the first bank 12 provided with the turbocharger 67. Closing the third control valve 66 when the engine is operating in the high speed, high load region prevents the exhaust gas pulsations from being transmitted and enables the performance of the cylinder group of the second bank 13 not provided with a turbocharger to be ensured, while suppressing a deterioration of combustion in the cylinder group of the first bank 12 provided with the turbocharger 67.

Figure 5:
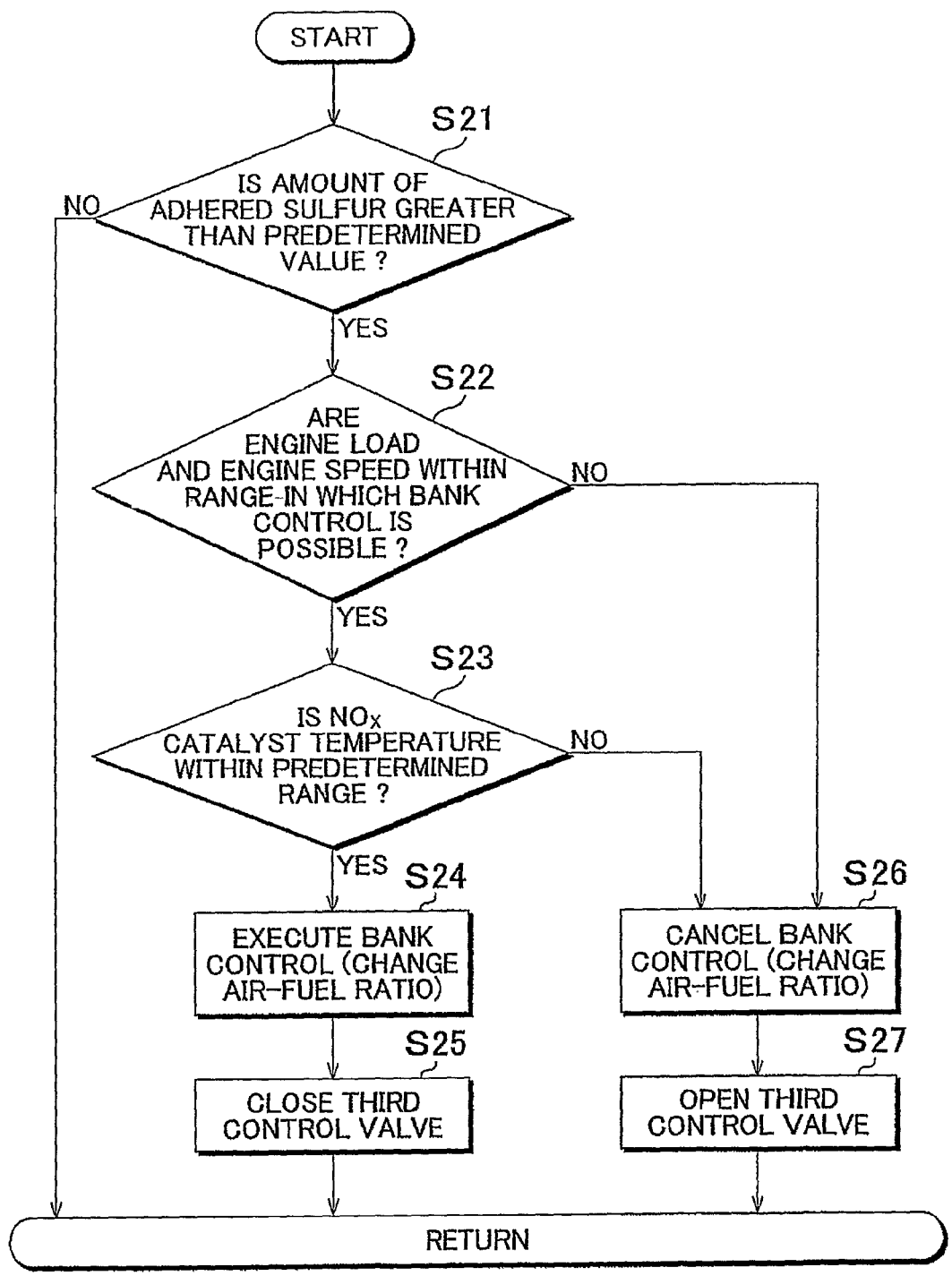
FIG. 5 is a flowchart related to open/close control of a third control valve in a V-type six cylinder engine according to a second example embodiment of the invention.
Figure 6:
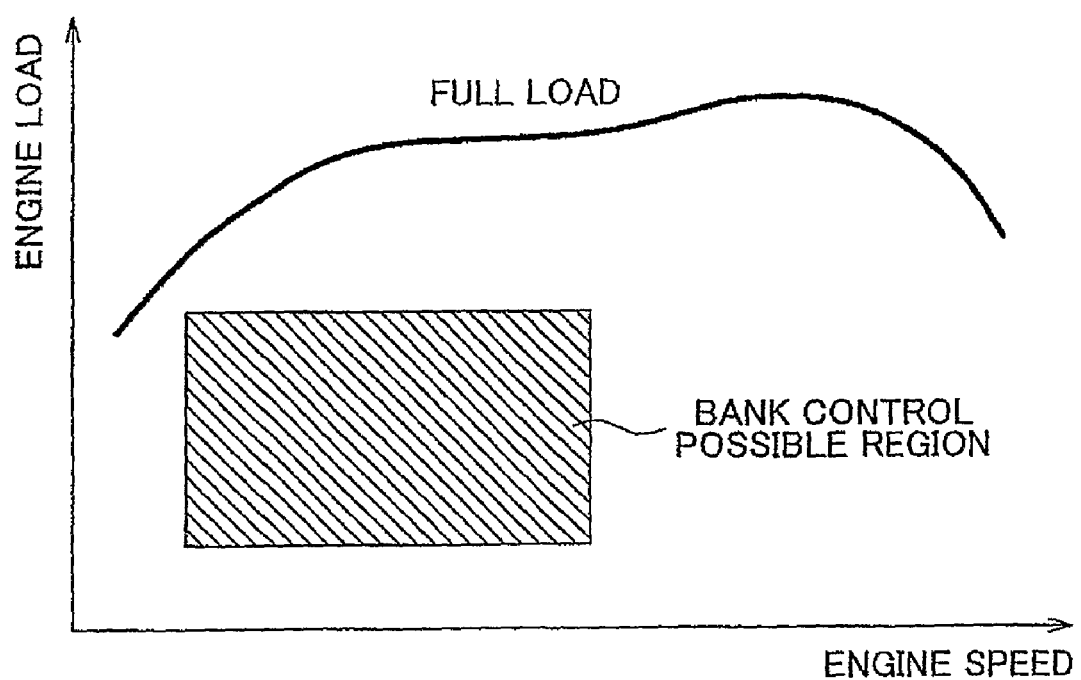
FIG. 6 is a graph showing a bark control region of the V-type six cylinder engine of the second example embodiment.

FIG. 5 is a flowchart related to the open/close control of the third control valve in the V-type six cylinder engine that represents an internal combustion engine according to a second example embodiment of the invention. FIG. 6 is a graph showing a bank control region of the V-type six cylinder engine of the second example embodiment. The overall structure of the internal combustion engine in this example embodiment is generally the same as that in the first example embodiment described above. Therefore, the second example embodiment will also be described with reference to FIGS. 1 and 2, and members that have the same function as they do in the first example embodiment will be denoted by the same reference numerals and redundant descriptions of those members will be omitted.

With the engine in the second example embodiment, as shown in FIGS. 1 and 2, two cylinder groups are formed by providing a plurality of cylinders in left and right first and second banks 12 and 13. An air cleaner 52 is mounted to an air inlet of an intake pipe 51 and an electronic throttle device 54 having a throttle valve 53 is provided downstream of this air cleaner 52. A surge tank 50 is connected to the downstream end portion of the intake pipe 51. This surge tank 50 is connected to intake ports 24 and 25 of the banks 12 and 13 via intake manifolds 48 and 49.

Exhaust pipes 57 and 58 are connected to exhaust ports 26 and 27 via exhaust manifolds 55 and 56. A first upstream three-way catalyst 59 is mounted in the first exhaust pipe 57 while a second upstream three-way catalyst 60 is mounted in the second exhaust pipe 58. The downstream end portions of the first and second exhaust pipe 57 and 58 are connected together, merging into an exhaust gas merger pipe 61. A $NO_X$ storage reduction catalyst 62 is mounted in this exhaust gas merger pipe 61. Also, a turbocharger 67 is provided on the first bank 12 side.

Also, a first exhaust pipe 57 and a second exhaust pipe 58 are communicated with each other by a communicating pipe 63 upstream, in the direction in which exhaust gas flows, of the positions in which the upstream three-way catalysts 59 and 60 are mounted. A first control valve 64 and a second control valve 65 are mounted downstream, in the direction in which exhaust gas flows, of the upstream three-way catalysts 59 and 60 in the first exhaust pipe 57 and the second exhaust pipe 58. The first, second, and third control valves 64, 65, and 66 are flowrate control valves. An ECU 79 can adjust the flowrate of the exhaust gas that flows through the exhaust pipes 57 and 58, as well as the communicating pipe 63, by adjusting the opening amounts of these first, second, and third control valves 64, 65, and 66 according to the operating state of the engine. That is, the ECU 79 performs various bank control by changing the combustion states of the banks 12 and 13 and the discharge flow paths of the exhaust gas.

For example, the exhaust gas from the cylinder group of the first bank 12 is made lean and the exhaust gas from the cylinder group of the second bank 13 is made rich. Meanwhile, the first control valve 64 and the second control valve 65 are opened so that the lean exhaust gas discharged from the cylinder group of the first bank 12 flows into the first exhaust pipe 57 and the rich exhaust gas discharged from the cylinder group of the second bank 13 flows into the second exhaust pipe 58. The rich and lean exhaust gases then merge at the exhaust gas merger pipe 61. The resultant oxidation exothermic reaction that takes place in the $NO_X$ storage reduction catalyst 62 is used to warm up the $NO_X$ storage reduction catalyst 62 and release the sulfur components accumulated in the $NO_X$ storage reduction catalyst 62, thereby recovering the $NO_X$ storage reduction catalyst 62.

In a typical V-type multiple cylinder engine, combustion in the cylinders takes place at predetermined intervals and the force generated by this combustion (i.e., the engine output) differs depending on the operating state of the engine. As a result, a plurality of positive pressure waves of the exhaust gas reach the exhaust pipes 57 and 58 that are connected to the cylinder groups of the first and second banks 12 and 13. This plurality of positive pressure waves transmitted inside the exhaust pipes 57 and 58 generate exhaust gas pulsations inside the communicating pipe 63. These exhaust gas pulsations that are generated in the communicating pipe 63 prevent the exhaust gas in the combustion chambers 22 and 23 from discharging properly into the exhaust pipes 57 and 58 through the exhaust ports 26 and 27, and as a result, some of the exhaust gas remains in the combustion chambers 22 and 23. This adversely effects combustion, causes knocking, and adversely effects fuel efficiency and output.

In particular, when the $NO_X$ storage reduction catalyst 62 is warmed up and sulfur poisoning recovery is executed by merging the lean exhaust gas discharged from the cylinder group of the first bank 12 with the rich exhaust gas discharged from the cylinder group of the second bank 13 immediately upstream of the $NO_X$ storage reduction catalyst 62, the lean exhaust gas and the rich exhaust gas merge from the exhaust gas pulsations generated in the communicating pipe 63 such that the $NO_X$ storage reduction catalyst 62 is unable to warm up well and sulfur poisoning recovery is unable to be performed.

Therefore, with the engine according to the second example embodiment, as described above, a third control valve 66 is mounted in the communicating pipe 63. The ECU 79 which serves as a control portion opens and closes this third control valve 66 according to the operating state of the engine so as to reduce various adverse effects caused by the exhaust gas pulsations.

More specifically, the ECU 79 closes the third control valve 66 when sulfur poisoning recovery is executed in the $NO_X$ storage reduction catalyst 62 by making the exhaust gas discharged from cylinder group of the first bank 12 lean and making the exhaust gas discharged from the cylinder group of the second bank 13 rich and then merging the lean exhaust gas discharged from the cylinder group of the first bank 12 with the rich exhaust gas discharged from the cylinder group of the second bank 13 immediately upstream of the $NO_X$ storage reduction catalyst 62. The ECU 79 opens the third control valve 66 when the engine is operating in a region where bank control is possible (i.e., a bank control possible region).

Here, the open/close control of the third control valve 66 in the V-type six cylinder engine of the second example embodiment will now be described in detail with reference to the flowchart in FIG. 5.

As shown in FIG. 5, in the open/close control of the third control valve 66 in the V-type six cylinder engine of the second example embodiment, it is determined in step S21 whether the sulfur component stored in the $NO_X$ storage reduction catalyst 62 has exceeded a predetermined value of a stored sulfur amount that is set in advance. In this case, the sulfur component stored in the $NO_X$ storage reduction catalyst 62 may be estimated based on, for example, the time or running distance of the vehicle after the sulfur poisoning recovery control was last executed. If it is determined here that the sulfur component stored in the $NO_X$ storage reduction catalyst 62 does not exceed the predetermined value of the stored sulfur amount, then this cycle of the routine immediately ends without any other steps being taken.

If, on the other hand, it is determined in step S21 that the sulfur component stored in the $NO_X$ storage reduction catalyst 62 has exceeded the predetermined value of the stored sulfur amount, it is then determined in step S22 whether the operating state of the engine, such as the engine load and the engine speed, is in a range in which bank control is possible. In this example embodiment, this determination is made using a map, which is shown in FIG. 6, of the engine load with respect to the engine speed. If it is determined here that the engine load and engine speed are within the range in which bank control is possible, it is then determined in step S23 whether the temperature of the $NO_X$ storage reduction catalyst 62 is within a predetermined temperature range that is set in advance. In this example embodiment, a temperature sensor is provided in the exhaust gas merger pipe 61 immediately upstream of the $NO_X$ storage reduction catalyst 62 and it is determined whether the exhaust gas temperature detected by this temperature sensor is within the predetermined temperature range that was set in advance. If the temperature of the $NO_X$ storage reduction catalyst 62 (i.e., the exhaust gas temperature) is equal to or less than a low temperature (such as 300° C.), unburned HC is unable to be purified by rich exhaust gas so bank control is not executed. Also, when the temperature of the $NO_X$ storage reduction catalyst 62 (i.e., the exhaust gas temperature) is equal to or greater than a high temperature (such as 700° C.), the sulfur component easily releases but the $NO_X$ storing agent precious metal) carried on the $NO_X$ storage reduction catalyst 62 ends up thermally degrading so bank control is not executed.

Then if it is determined in step S23 that the temperature of the $NO_X$ storage reduction catalyst 62 is within the predetermined temperature range, the air-fuel ratios of the cylinder groups of the banks 12 and 13 are changed so that the exhaust gas discharged form the cylinder group of the first bank 12 is lean and the exhaust gas discharged from the cylinder group of the second bank 13 is rich in order to execute bank control in step S24. Then the ECU 79 closes the third control valve 66 in step S25.

As a result, the lean exhaust gas and the rich exhaust gas flow into the exhaust pipes 57 and 58 without passing through the communicating pipe 63, and merge at the $NO_X$ storage reduction catalyst 62 via the exhaust gas merger pipe 61. Consequently, the resultant oxidation exothermic reaction that takes place warms up the $NO_X$ storage reduction catalyst 62 such that sulfur poisoning recovery occurs.

If, on the other hand, it is determined in step S22 that the engine load and engine speed are not in a range in which bank control is possible or it is determined in step S23 that the temperature of the $NO_X$ storage reduction catalyst 62 is not within a predetermined temperature range, then the air-fuel ratio of the cylinder groups of the banks 12 and 13 are changed so that the air-fuel ratio of the exhaust gas discharged from the cylinder groups of the banks 12 and 13 becomes stoichiometric in order to cancel the bank control in step S26. Next, the ECU 79 opens the third control valve 66 in step S27.

In this way, with the V-type six cylinder engine which is the internal combustion engine of the second example embodiment, when the engine is operating in a range in which bank control is possible and the temperature of the $NO_X$ storage reduction catalyst 62 is within a predetermined temperature range, the ECU 79 makes the exhaust gas discharged from the cylinder group of the first bank 12 lean and makes the exhaust gas discharged from the cylinder group of the second bank 13 rich, as well as closes the third valve 66. As a result, the lean exhaust gas and the rich exhaust gas do not merge at the communicating pipe 63 but instead merge immediately upstream of the $NO_X$ storage reduction catalyst 62 so sulfur poisoning recovery control of the $NO_X$ storage reduction catalyst 62 is executed.

Accordingly, closing the third control valve 66 when executing sulfur poisoning recovery control of the $NO_X$ storage reduction catalyst 62 prevents exhaust gas pulsations from being transmitted by the communicating pipe 63, as well as prevents the lean exhaust gas from mixing with the rich exhaust gas in the communicating pipe 63. By mixing the lean exhaust gas and the rich exhaust gas just upstream of the $NO_X$ storage reduction catalyst 62, the $NO_X$ storage reduction catalyst 62 is able to be reliably warmed so that the adhered sulfur releases, enabling proper sulfur poisoning recovery to be performed.

Also, in the second example embodiment, during bank control, if the engine falls outside of the operating range where bank control is possible or the temperature of the $NO_X$ storage reduction catalyst 62 falls outside of the predetermined temperature range, the ECU 79 returns the exhaust gas discharged from the cylinder groups of the banks 12 and 13 to the stoichiometric air-fuel ratio and opens the third control valve 66. Accordingly, condensation at the area around the third control valve 66 will be reduced, adverse effects on the oxygen and the air-fuel ratio sensor and the like can be suppressed, and poor operation of the third control valve 66 due to soot in the exhaust gas can be inhibited.

Figure 7:
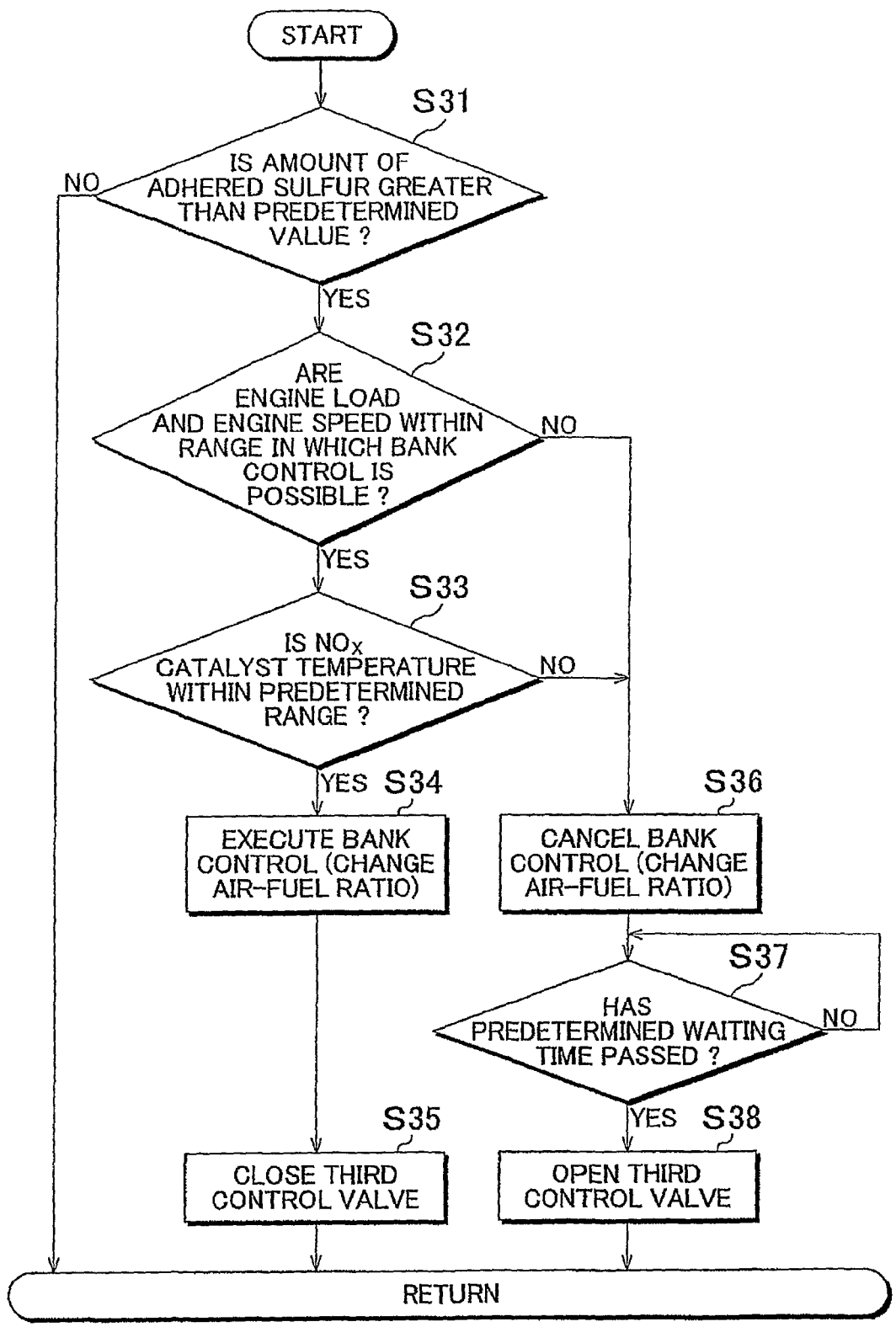
FIG. 7 is a flowchart related to open/close control of a third control valve in a V-type six cylinder engine according to a third example embodiment of the invention.

FIG. 7 is a flowchart related to open/close control of a third control valve in a V-type six cylinder engine that represents an internal combustion engine of a third example embodiment. Incidentally, the overall structure of the internal combustion engine in this example embodiment is generally the same as that in the first and second example embodiments described above. Therefore, the third example embodiment will also be described with reference to FIGS. 1 and 2, and members that have the same function as they do in the first and second example embodiments will be denoted by the same reference numerals and redundant descriptions of those members will be omitted.

In the engine according to the third example embodiment, the ECU 79 closes the third control valve 66 when executing sulfur poisoning recovery control of the $NO_X$ storage reduction catalyst 62 by making the exhaust gas discharged from the cylinder group of the first bank 12 lean, making the exhaust gas discharged from the cylinder group of the second bank 13 rich, and merging the lean exhaust gas and rich exhaust gas just upstream of the $NO_X$ storage reduction catalyst 62. Also, when the operating state of the engine falls outside of the region in which bank control is possible, the ECU 79 changes the air-fuel ratio of the cylinder groups of the first and second banks 12 and 13 and after a predetermined period of time which has been set in advance passes, then opens the third control valve 66.

The open/close control of the third control valve 66 in the V-type six cylinder engine of the third example embodiment will now be described in detail with reference to the flowchart in FIG. 7.

As shown in FIG. 7, in the open/close control of the third control valve 66 in the V-type six cylinder engine of the third example embodiment, it is determined in step S31 whether the sulfur component stored in the $NO_X$ storage reduction catalyst 62 has exceeded a predetermined value of a stored sulfur amount that is set in advance. If it is determined here that the sulfur component stored in the $NO_X$ storage reduction catalyst 62 does not exceed the predetermined value of the stored sulfur amount, then this cycle of the routine immediately ends without any other steps being taken.

If, on the other hand, it is determined in step S31 that the sulfur component stored in the $NO_X$ storage reduction catalyst 62 has exceeded the predetermined value of the stored sulfur amount, it is then determined in step S32 whether the operating state of the engine, such as the engine load and the engine speed, is in a range in which bank control is possible. If it is determined here that the engine load and engine speed are within the range in which bank control is possible, it is then determined in step S33 whether the temperature of the $NO_X$ storage reduction catalyst 62 is within a predetermined temperature range that is set in advance. If the temperature of the $NO_X$ storage reduction catalyst 62 is equal to or less than a low temperature (such as 300° C.), unburned HC is unable to be purified by rich exhaust gas so bank control is not executed. Also, when the temperature of the $NO_X$ storage reduction catalyst 62 is equal to or greater than a high temperature (such as 700° C.), the sulfur component easily releases but the $NO_X$ storing agent (precious metal) carried on the $NO_X$ storage reduction catalyst 62 ends up thermally degrading so bank control is not executed.

Then when it is determined in step S33 that the temperature of the $NO_X$ storage reduction catalyst 62 is within the predetermined temperature range, the air-fuel ratios of the cylinder groups of the banks 12 and 13 are changed so that the exhaust gas discharged form the cylinder group of the first bank 12 is lean and the exhaust gas discharged from the cylinder group of the second bank 13 is rich in order to execute bank control in step S34. Then the ECU 79 closes the third control valve 66 in step S35.

As a result, the lean exhaust gas and the rich exhaust gas flow into the exhaust pipes 57 and 58 without passing through the communicating pipe 63 and merge at the $NO_X$ storage reduction catalyst 62 via the exhaust gas merger pipe 61. Consequently, the resultant oxidation exothermic reaction that takes place warms up the $NO_X$ storage reduction catalyst 62 such that sulfur poisoning recovery occurs.

If, on the other hand, it is determined in step S32 that the engine load and engine speed are not in a range in which bank control is possible and it is determined in step S33 that the temperature of the $NO_X$ storage reduction catalyst 62 is not within a predetermined temperature range, then the air-fuel ratios of the cylinder groups of the banks 12 and 13 are changed so that the exhaust gas discharged from the cylinder group of the banks 12 and 13 become stoichiometric in order to cancel the bank control in step S36. Then in step S37 it is determined whether a predetermined waiting time has passed after the air-fuel ratios of the cylinder groups of the banks 12 and 13 have been changed. Once this predetermined waiting time has passed, the ECU 79 opens the third control valve 66 in step S38.

In this way, with the V-type six cylinder engine which is the internal combustion engine of the third example embodiment, when the engine is operating in a range in which bank control is possible and the temperature of the $NO_X$ storage reduction catalyst 62 is within a predetermined temperature range, the ECU 79 makes the exhaust gas discharged from the cylinder group of the first bank 12 lean and makes the exhaust gas discharged from the cylinder group of the second bank 13 rich, as well as closes the third valve 66. However, if the engine falls out of the operating range in which bank control is possible or the temperature of the $NO_X$ storage reduction catalyst 62 falls out of the predetermined temperature range, the ECU 79 makes the exhaust gas of the cylinder groups of the first and second banks 12 and 13 stoichiometric, and after a predetermined period of time which has been set in advance has passed, opens the third control valve 66.

Accordingly, when canceling the sulfur poisoning recovery control of the $NO_X$ storage reduction catalyst 62, the air-fuel ratio of the exhaust gas is made the stoichiometric air-fuel ratio and then after a predetermined period of time has passed, the third control valve 66 is opened. The third control valve 66 is opened after making the temperature of the exhaust gas discharged from the cylinder groups of the first and second banks 12 and 13 the same by returning to the stoichiometric air-fuel ratio from a state in which there was a temperature difference between the lean exhaust gas and the rich exhaust gas, thus reducing amount of condensation that forms.

Incidentally, in this example embodiment, bank control which makes the exhaust gas discharged from the cylinder group of the first bank 12 lean and makes the exhaust gas discharged from the cylinder group of the second bank 13 rich is executed and the third control valve 66 is closed when executing the sulfur poisoning recovery control of the $NO_X$ storage reduction catalyst 62. However, the $NO_X$ storage reduction catalyst 62 may be warmed up and activated early by executing bank control and closing the third control valve 66 when the engine is cold-started as well.

Figure 8:
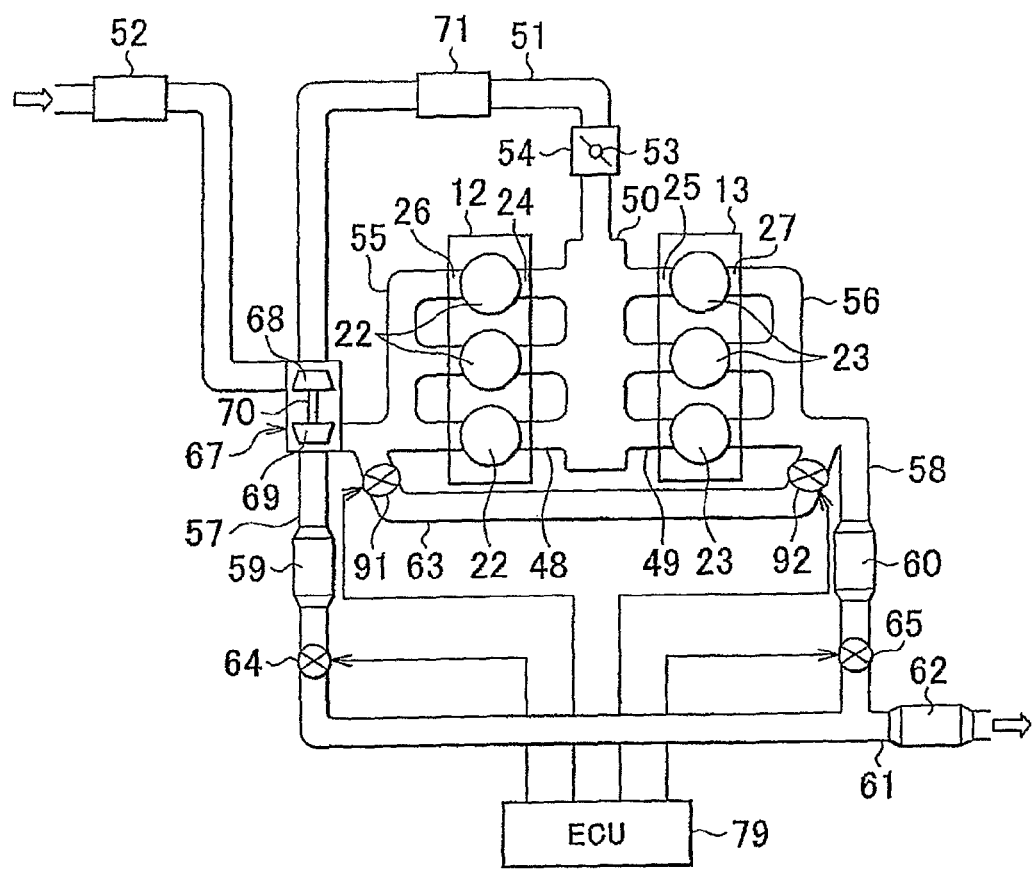
FIG. 8 is a plan view schematically showing a V-type six cylinder engine that represents an internal combustion engine according to a fourth example embodiment of the invention.

FIG. 8 is a plan view schematically showing a V-type six cylinder engine that represents an internal combustion engine according to a fourth example embodiment of the invention. Members that have the same function as they do in the foregoing example embodiments will be denoted by the same reference numerals and redundant descriptions of those members will be omitted. As shown in FIG. 8, in the engine according to the fourth example embodiment, a first control valve 64 and a second control valve 65 are mounted downstream, in the direction in which exhaust gas flows, of upstream three-way catalysts 59 and 60 in first and second exhaust pipes 57 and 58, respectively. Also, third control valves 91 and 92 are mounted in positions near the first exhaust pipe 57 and the second exhaust pipe 58, respectively, in the communicating pipe 63, which differs from the structure of the second example embodiment. The first, second, and third control valves 64, 65, 91, and 92 are flowrate control valves. An ECU 79 can adjust the flowrate of exhaust gas that flows through the exhaust pipes 57 and 58 as well as the communicating pipe 63 by adjusting the opening amounts of these first, second, and third control valves 64, 65, 91, and 92 according to the operating state of the engine. That is, the ECU 79 performs various bank control by changing the combustion state of the banks 12 and 13 and discharge flow path of the exhaust gas.

With the engine according to the fourth example embodiment, when executing bank control in which the exhaust gas discharged from the cylinder group of the first bank 12 is made lean and the exhaust gas discharged from the cylinder group of the second bank 13 is made rich, the ECU 79 closes the third control valves 91 and 92, which prevents the exhaust gas in the exhaust pipes 57 and 58 from mixing and reduces the exhaust gas pulsations generated in the communicating pipe 63.

In this way, with the V-type six cylinder engine which is the internal combustion engine of the fourth example embodiment, the intake pipe 51 is connected to both of the cylinder groups of the left and right first and second banks 12 and 13. Meanwhile, the first exhaust pipe 57 is connected to the first bank 12 and the second exhaust pipe 58 is connected to the second bank 13. The first upstream three-way catalyst 59 and the first control valve 64 are provided in the exhaust pipe 57 and the second upstream three-way catalyst 60 and the second control valve 65 are provided in the exhaust pipe 58. Size exhaust pipes 57 and 58 are connected together upstream of the upstream three-way catalysts 59 and 60 and the control valves 64 and 65 by the communicating pipe 63. The third control valves 91 and 92 are provided near the first and second exhaust pipes 57 and 58, respectively, in the communicating pipe 63. The ECU 79 opens and closes the third control valves 91 and 92 according to the operating state of the engine.

Accordingly, by opening and closing not only the first and second control valves 64 and 65 but also the third control valves 91 and 92 according to the operating state of the engine, exhaust gas pulsations that are transmitted from the exhaust pipe of one bank to the exhaust pipe of the other bank through the communicating pipe 63 are reduced. As a result, it is possible to suppress adverse effects from the exhaust gas pulsation, and making it possible to suppress deterioration of combustion by reducing the amount of residual gas, suppress knocking, and suppress deterioration of fuel efficiency and output. When exhaust gas pulsations in the communicating pipe 63 are reduced by closing the third control valves 91 and 92, the flow of exhaust gas is blocked near the first exhaust pipe 57 and the second exhaust pipe 58 in the communicating pipe 63. As a result, no exhaust gas flows into the communicating pipe 63, which suppresses a decrease in temperature from radiation of the exhaust gas at the communicating pipe 63 and makes good bank control possible.

Figure 9:
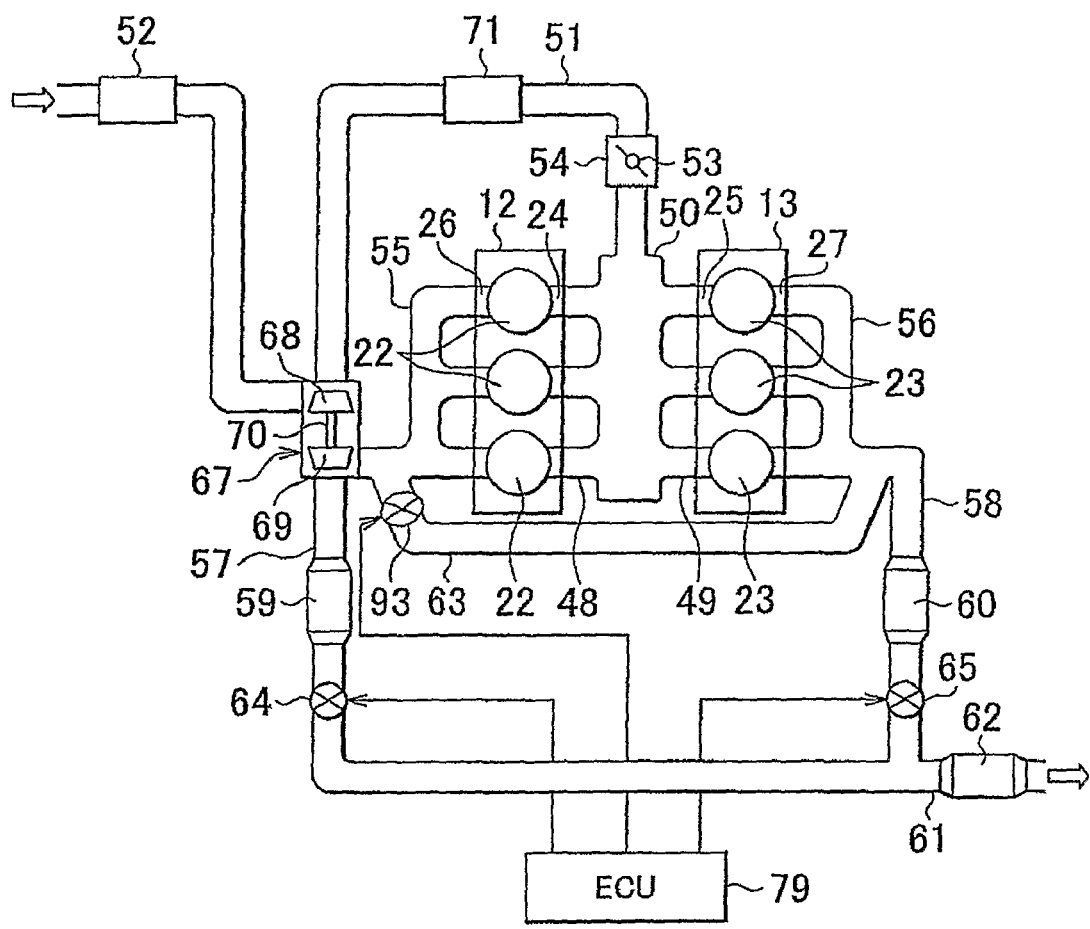
FIG. 9 is a plan view schematically showing a V-type six cylinder engine that represents an internal combustion engine according to a fifth example embodiment of the invention.

FIG. 9 is a plan view schematically showing a V-type six cylinder engine that represents an internal combustion engine according to a fifth example embodiment of the invention.

Members that have the same function as they do in the foregoing example embodiments will be denoted by the same reference numerals and redundant descriptions of those members will be omitted. As shown in FIG. 9, in the engine according to the fifth example embodiment, a first control valve 64 and a second control valve 65 are mounted downstream, in the direction in which exhaust gas flows, of upstream three-way catalysts 59 and 60 in first and second exhaust pipes 57 and 58, respectively. Also, a third control valve 93 is mounted in a communicating pipe 63 near the first exhaust pipe 57 of a first bank 12 provided with has a turbocharger 67, which differs from the structures of the second and third example embodiments. The first, second, and third control valves 64, 65, and 93 are flowrate control valves. An ECU 79 can adjust the flowrate of exhaust gas that flows through the exhaust pipes 57 and 58 as well as the communicating pipe 63 by adjusting the opening amounts of these first, second, and third control valves 64, 65, and 93 according to the operating state of the engine. That is, the ECU 79 performs various bank control by changing the combustion state of the banks 12 and 13 and discharge flow path of the exhaust gas.

With the engine according to the fifth example embodiment, when executing bank control in which the exhaust gas discharged from the cylinder group of the first bank 12 is made lean and the exhaust gas discharged from the cylinder group of the second bank 13 is made rich, the ECU 79 closes the third control valve 93, which prevents the exhaust gas in the exhaust pipes 57 and 58 from mixing and reduces the exhaust gas pulsations generated in the communicating pipe 63.

In this way, with the V-type six cylinder engine which is the internal combustion engine of the fifth example embodiment, the intake pipe 51 is connected to both of the cylinder groups of the left and right first and second banks 12 and 13. Meanwhile, the first exhaust pipe 57 is connected to the first bank 12 and the second exhaust pipe 58 is connected to the second bank 13. The first upstream three-way catalyst 59 and the first control valve 64 are provided in the exhaust pipe 57 and the second upstream three-way catalyst 60 and the second control valve 65 are provided in the exhaust pipe 58. The exhaust pipes 57 and 58 are connected together upstream of the upstream three-way catalysts 59 and 60 and the control valves 64 and 65 by the communicating pipe 63. The third control valve 93 is provided in the communicating pipe 63 near the first exhaust pipe 57 on the first bank 12 side with the turbocharger 67. The ECU 79 opens and closes the third control valve 93 according to the operating state of the engine.

Accordingly, by opening and closing not only the first and second control valves 64 and 65 but also the third control valve 93 according to the operating state of the engine, exhaust gas pulsations that are transmitted from the exhaust pipe of one bank to the exhaust pipe of the other bark through the communicating pipe 63 are reduced. As a result, it is possible to suppress adverse effects from the exhaust gas pulsation, and making it possible to suppress deterioration of combustion by reducing the amount of residual gas, suppress knocking, and suppress deterioration of fuel efficiency and output. When exhaust gas pulsations in the communicating pipe 63 are reduced by closing the third control valve 93, the flow of exhaust gas is blocked near the first exhaust pipe 57 in the communicating pipe 63. As a result, no exhaust gas flows into the communicating pipe 63 from the first exhaust pipe 57 in which there is high backpressure from the turbocharger 67 (i.e., turbine 69), thereby suppressing a decrease in temperature from radiation of the exhaust gas at the communicating pipe 63 and preventing a decline in transient responsiveness due to the drop in the exhaust gas volume of the turbocharger 67, making good bank control possible.

Incidentally, in the foregoing example embodiments, the upstream three-way catalysts 59 and 60 are mounted in both of the exhaust pipes 57 and 58 of the banks 12 and 13. Alternatively, however, an upstream three-way catalyst may be mounted in only one of the exhaust pipes 57 or 58 and another three-way catalyst may be provided in the exhaust gas merger pipe 61. Also, the turbocharger 67 is provided in the first bank 12 and turbocharging is performed for the first and second banks 12 and 13. However, a separate turbocharger may be provided for each of the banks 12 and 13 or no turbocharger need be provided for either of the banks 12 and 13.

Also, in the foregoing example embodiment, a V-type six cylinder engine is used as the internal combustion engine, but the engine configuration and number of cylinders and the like are not limited to those described the example embodiments. Moreover, the type of fuel injection of the internal combustion engine described is an in-cylinder fuel injection but it may also be a port injection. Further, the combustion mode is not limited to the lean combustion mode. In this case, the $NO_X$ storage reduction catalyst becomes unnecessary.

As described above, the internal combustion engine according to the invention suppresses adverse effects from exhaust gas pulsations generated in the communicating passage that provides communication between the exhaust passages of the first and second banks. As a result, good bank control is made possible and deterioration of combustion is suppressed by reducing the amount of residual gas, knocking is suppressed, and deterioration of fuel efficiency and output is suppressed. Incidentally, the configuration and number of cylinders in the internal combustion engine of the invention is not limited to those of the internal combustion engine in the foregoing example embodiments.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An internal combustion engine comprising:
two cylinder groups in which a plurality of cylinders are arranged divided into two banks;
an intake passage provided for the cylinder groups;
an exhaust passage provided separately for each cylinder group;
an exhaust gas control valve that is provided in each exhaust passage and adjusts a flowrate of exhaust gas;
a control catalyst provided in at least one of the exhaust passages;
a communicating passage that provides communication between the exhaust passages upstream of the control valves and the control catalyst;
a communication control valve that is provided in the communicating passage and adjusts the flowrate of the exhaust gas;
a supercharger provided upstream of the control catalyst in one of the exhaust passages of the two cylinder groups; and
a control portion that selectively opens and closes and communication control valve according to an operating state of the internal combustion engine,
wherein the control portion opens the communication control valve when the internal combustion engine is operating at a high load, and an exhaust gas pressure upstream of a turbine of the supercharger is greater than a boost pressure downstream of a compressor of the supercharger.

2. The internal combustion engine according to claim 1, wherein when the internal combustion engine is operating at a high load, the control portion opens the exhaust gas control valve and selectively opens and closes the communication control valve.

3. The internal combustion engine according to claim 1, wherein during startup of the internal combustion engine, the control portion opens the communication control valve and one of the exhaust gas control valve, and closes the other exhaust gas control valve.

4. The internal combustion engine according to claim 3, wherein when the control catalyst provided in the exhaust passage in which the exhaust gas control valve is open is activated, the control portion opens the communication control valve and the exhaust gas control valves and makes the air-fuel ratios of the cylinder groups of the two banks stoichiometric.

5. An internal combustion engine comprising:
two cylinder groups in which a plurality of cylinders are arranged divided into two banks;
an intake passage provided for the cylinder groups;
an exhaust passage provided separately for each cylinder group;
an exhaust gas control valve that is provided in each exhaust passage and adjusts a flowrate of exhaust gas;
a control catalyst provided in at least one of the exhaust passages;
a communicating passage that provides communication between the exhaust passages upstream of the control valves and the control catalyst;
a communication control valve that is provided in the communicating passage and adjusts the flowrate of the exhaust gas;
a supercharger provided upstream of the control catalyst in one of the exhaust passages of the two cylinder groups; and
a control portion that selectively opens and closes the communication control valve according to an operating state of the internal combustion engine,
wherein the control portion closes the communication control valve when the internal combustion engine is operating at a high load, and an exhaust gas pressure upstream of a turbine of the supercharger is less than a boost pressure downstream of a compressor of the supercharger.

6. The internal combustion engine according to claim 5, wherein when the internal combustion engine is operating at a high load, the control portion opens the exhaust gas control valve and selectively opens and closes the communication control valve.

7. The internal combustion engine according to claim 5, wherein during startup of the internal combustion engine, the control portion opens the communication control valve and one of the exhaust gas control valve, and closes the other exhaust gas control valve.

8. The internal combustion engine according to claim 7, wherein when the control catalyst provided in the exhaust passage in which the exhaust gas control valve is open is activated, the control portion opens the communication control valve and the exhaust gas control valves and makes the air-fuel ratios of the cylinder groups of the two banks stoichiometric.

9. An internal combustion engine comprising:
two cylinder groups in which a plurality of cylinders are arranged divided into two banks;
an intake passage provided for the cylinder groups;
an exhaust passage provided separately for each cylinder group;
an exhaust gas control valve that is provided in each exhaust passage and adjusts a flowrate of exhaust gas;
a control catalyst provided in at least one of the exhaust passages;
a communicating passage that provides communication between the exhaust passages upstream of the control valves and the control catalyst;
a communication control valve that is provided in the communicating passage and adjusts the flowrate of the exhaust gas;
a supercharger provided upstream of the control catalyst in one of the exhaust passages of the two cylinder groups; and
a control portion that selectively opens and closes the communication control valve according to an operating state of the internal combustion engine,
wherein the control portion closes the communication control valve during bank control in which one of the two cylinder groups is operated with a lean air-fuel ratio and the other of the two cylinder groups is operated with a rich air-fuel ratio.

10. The internal combustion engine according to claim 9, wherein the control portion opens the communication control valve when the operating state of the internal combustion engine is not within an operating region in which the bank control is possible.

11. The internal combustion engine according to claim 10, wherein when the operating state of the internal combustion engine falls outside of the operating region in which the bank control is possible, the control portion changes the air-fuel ratios of the two cylinder groups to a stoichiometric air-fuel ratio and opens the communication control valve.

12. The internal combustion engine according to claim 10, wherein when the operating state of the internal combustion engine falls outside of the operating region in which the bank control is possible, the control portion changes the air-fuel ratios of the two cylinder groups to a stoichiometric air-fuel ratio, and after a predetermined period of time which is set in advance has passed, opens the communication control valve.

13. The internal combustion engine according to claim 9, further comprising:
an exhaust gas merger passage into which the downstream end portions of the exhaust passages merge; and
a $NO_X$ storage reduction catalyst provided in the exhaust gas merger passage,
wherein the control portion executes the bank control when a sulfur component stored in the $NO_X$ storage reduction catalyst has become greater than a preset stored sulfur amount.

14. The internal combustion engine according to claim 9, further comprising:
an exhaust gas merger passage into which the downstream end portions of the exhaust passages merge; and
a $NO_X$ storage reduction catalyst provided in the exhaust gas merger passage,
wherein the control portion executes the bank control when a sulfur component stored in the $NO_X$ storage reduction catalyst has become greater than a preset stored sulfur amount, and a temperature of the $NO_X$ storage reduction catalyst is within a predetermined temperature range.

15. The internal combustion engine according to claim 9, wherein when the internal combustion engine is operating at a high load, the control portion opens the exhaust gas control valve and selectively opens and closes the communication control valve.

16. The internal combustion engine according to claim 9, wherein during startup of the internal combustion engine, the control portion opens the communication control valve and one of the exhaust gas control valve, and closes the other exhaust gas control valve.

17. The internal combustion engine according to claim 16, wherein when the control catalyst provided in the exhaust passage in which the exhaust gas control valve is open is activated, the control portion opens the communication control valve and the exhaust gas control valves and makes the air-fuel ratios of the cylinder groups of the two banks stoichiometric.

18. A method for controlling the internal combustion engine which includes: two cylinder groups in which a plurality of cylinders are arranged divided into two banks; an intake passage provided for the cylinder groups; an exhaust passage provided separately for each cylinder group; an exhaust gas control valve that is provided in each exhaust passage and adjusts a flowrate of exhaust gas; a control catalyst provided in at least one of the exhaust passages; a communicating passage that provides communication between the exhaust passages upstream of the control valves and the control catalyst; a communication control valve that is provided in the communicating passage and adjusts the flowrate of the exhaust gas; and a supercharger provided upstream of the control catalyst in one of the exhaust passages of the two cylinder groups,
the control method comprising;
selectively opening and closing the communication control valve according to an operating state of the internal combustion engine; and
opening the communication control valve when the internal combustion engine is operating at a high load, and an exhaust pressure upstream of a turbine of the supercharger is greater than a pressure boost downstream of a compressor of the supercharger.

19. A method for controlling the internal combustion engine which includes: two cylinder groups in which a plurality of cylinders are arranged divided into two banks; an intake passage provided for the cylinder groups; an exhaust passage provided separately for each cylinder group; an exhaust gas control valve that is provided in each exhaust passage and adjusts a flowrate of exhaust gas; a control catalyst provided in at least one of the exhaust passages; a communicating passage that provides communication between the exhaust passages upstream of the control valves and the control catalyst; a communication control valve that is provided in the communicating passage and adjusts the flowrate of the exhaust gas; and a supercharger provided upstream of the control catalyst in one of the exhaust passages of the two cylinder groups,
the control method comprising:
selectively opening and closing the communication control valve according to an operating state of the internal combustion engine; and
closing the communication control valve when the internal combustion engine is operating at a high load, and an exhaust pressure upstream of a turbine of the supercharger is less than a pressure boost downstream of a compressor of the supercharger.

20. A method for controlling the internal combustion engine which includes: two cylinder groups in which a plurality of cylinders are arranged divided into two banks; an intake passage provided for the cylinder groups; an exhaust passage provided separately for each cylinder group; an exhaust gas control valve that is provided in each exhaust passage and adjusts a flowrate of exhaust gas; a control catalyst provided in at least one of the exhaust passages; a communicating passage that provides communication between the exhaust passages upstream of the control valves and the control catalyst; a communication control valve that is provided in the communicating passage and adjusts the flowrate of the exhaust gas; and a supercharger provided upstream of the control catalyst in one of the exhaust passages of the two cylinder groups, the control method comprising:
selectively opening and closing the communication control valve according to an operating state of the internal combustion engine; and
closing communication control valve when the internal combustion engine is operating at a low speed and high load.

21. A method for controlling the internal combustion engine which includes: two cylinder groups in which a plurality of cylinders are arranged divided into two banks; an intake passage provided for the cylinder groups; an exhaust passage provided separately for each cylinder group; an exhaust gas control valve that is provided in each exhaust passage and adjusts a flowrate of exhaust gas; a control catalyst provided in at least one of the exhaust passages; a communicating passage that provides communication between the exhaust passages upstream of the control valves and the control catalyst; a communication control valve that is provided in the communicating passage and adjusts the flowrate of the exhaust gas; and a supercharger provided upstream of the control catalyst in one of the exhaust passages of the two cylinder groups, the control method comprising:
selectively opening and closing the communication control valve according to an operating state of the internal combustion engine; and
closing the communication control valve during bank control in which one of the two cylinder groups is operated with a lean air-fuel ratio and the other of the two cylinder groups is operated with a rich air-fuel ratio.

* * * * *